(12) United States Patent
Ishizu et al.

(10) Patent No.: US 8,315,424 B2
(45) Date of Patent: Nov. 20, 2012

(54) IMAGE PROCESSING APPARATUS, IMAGE PROCESSING METHOD, AND PROGRAM PRODUCT

(75) Inventors: Taeko Ishizu, Yashio (JP); Akihiro Mihara, Kawasaki (JP); Hiroshi Shimura, Yokosuka (JP); Masaaki Ishikawa, Tokyo (JP); Haike Guan, Yokohama (JP); Yasushi Abe, Yokohama (JP); Motohiro Kuroda, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1176 days.

(21) Appl. No.: 12/076,396

(22) Filed: Mar. 18, 2008

(65) Prior Publication Data

US 2008/0232640 A1 Sep. 25, 2008

(30) Foreign Application Priority Data

Mar. 19, 2007 (JP) .................. 2007-071283
Jul. 11, 2007 (JP) .................. 2007-182256

(51) Int. Cl.
*G06K 9/00* (2006.01)
*H04N 1/40* (2006.01)
(52) U.S. Cl. ....... 382/100; 358/3.28; 345/629; 348/589; 713/176
(58) Field of Classification Search .............. 358/3.28; 382/100; 345/629–641; 348/589; 713/176
See application file for complete search history.

(56) References Cited

U.S. PATENT DOCUMENTS

| | | | | |
|---|---|---|---|---|
| 6,373,974 B2* | 4/2002 | Zeng | ........................... | 382/135 |
| 6,963,363 B1 | 11/2005 | Ohmura | | |
| 7,222,235 B1* | 5/2007 | Mitsui | ........................... | 713/176 |
| 7,720,287 B2* | 5/2010 | Sasamori et al. | .............. | 382/190 |
| 7,796,826 B2* | 9/2010 | Rhoads et al. | ................. | 382/233 |
| 8,010,477 B2* | 8/2011 | Rogers et al. | ................... | 706/47 |
| 2001/0012019 A1* | 8/2001 | Yamazaki et al. | ............. | 345/639 |
| 2001/0033674 A1* | 10/2001 | Chen et al. | ..................... | 382/100 |
| 2002/0002679 A1* | 1/2002 | Murakami et al. | ............ | 713/176 |
| 2002/0033844 A1* | 3/2002 | Levy et al. | ..................... | 345/744 |
| 2002/0104003 A1* | 8/2002 | Iwamura | ........................ | 713/176 |
| 2003/0058480 A1 | 3/2003 | Miyake et al. | | |
| 2003/0076979 A1* | 4/2003 | Matsui | ......................... | 382/100 |
| 2003/0101141 A1* | 5/2003 | Iwamura | ........................ | 705/51 |

(Continued)

FOREIGN PATENT DOCUMENTS

EP 1 069 758 1/2001

(Continued)

OTHER PUBLICATIONS

Office Action for counterpart Japanese patent application No. 2007-071283 dated Jul. 19, 2011.

(Continued)

*Primary Examiner* — Chan S Park
*Assistant Examiner* — Avinash J Yentrapati
(74) *Attorney, Agent, or Firm* — Harness, Dickey & Pierce, P.L.C.

(57) ABSTRACT

An image processing apparatus configured to embed embedment information in image data includes an embedment information acquisition unit configured to acquire embedment information to be embedded in the image data, an information embedment manner determination unit configured to determine an information embedment manner to embed the embedment information according to one of the acquired embedment information and image data to be generated by embedding the acquired embedment information in the image data, and an information embedment unit configured to embed the acquired embedment information in image data according to the information embedment manner determined by the information embedment manner determination unit.

16 Claims, 17 Drawing Sheets

| | MAIN FUNCTIONS | | | | ADDITIONAL FUNCTIONS | | | | | | |
|---|---|---|---|---|---|---|---|---|---|---|---|
| | COPY RESTRIC-TION | TRACE | INSERTION CHAR-ACTERS | MANIP-ULATION DETECTION | APPEAR-ANCE | INFOR-MATION VOLUME | RE-QUIRED AREA | EMBEDMENT TIME | RETRIEVAL TIME | CUTTING RESISTANCE | EMBEDMENT STRENGTH |
| METHOD A | O | X | O | X | X | X | X | O | X | O | X |
| METHOD B | O | O | O | X | X | △ | X | △ | X | O | O |
| METHOD C | X | O | X | X | O | △ | △ | X | O | O | O |
| METHOD D | X | X | X | O | △ | O | X | △ | △ | O | △ |

U.S. PATENT DOCUMENTS

| | | | |
|---|---|---|---|
| 2003/0149936 A1* | 8/2003 | Tamaru | 715/515 |
| 2003/0210803 A1* | 11/2003 | Kaneda et al. | 382/100 |
| 2004/0148261 A1 | 7/2004 | Abe | |
| 2004/0184065 A1 | 9/2004 | Guan et al. | |
| 2005/0246536 A1* | 11/2005 | Roberts | 713/176 |
| 2005/0286088 A1* | 12/2005 | Takagi | 358/3.28 |
| 2006/0059347 A1* | 3/2006 | Herz et al. | 713/176 |
| 2006/0059462 A1* | 3/2006 | Yamamoto | 717/115 |
| 2006/0078159 A1* | 4/2006 | Hamatake et al. | 382/100 |
| 2006/0126095 A1 | 6/2006 | Tamura et al. | |
| 2006/0239503 A1* | 10/2006 | Petrovic et al. | 382/100 |
| 2007/0177761 A1* | 8/2007 | Levy | 382/100 |
| 2007/0183626 A1* | 8/2007 | Hashimoto et al. | 382/100 |
| 2008/0028221 A1* | 1/2008 | Endo et al. | 713/176 |
| 2008/0085052 A1* | 4/2008 | Sasamori et al. | 382/190 |
| 2008/0095397 A1* | 4/2008 | Rhoads et al. | 382/100 |
| 2008/0137149 A1* | 6/2008 | Loce et al. | 358/3.28 |
| 2008/0144115 A1* | 6/2008 | Ishii | 358/3.28 |
| 2008/0288211 A1* | 11/2008 | Pastrana et al. | 702/182 |

FOREIGN PATENT DOCUMENTS

| | | |
|---|---|---|
| JP | 08-154177 | 6/1996 |
| JP | 09-186603 | 7/1997 |
| JP | 2002-158978 | 5/2002 |
| JP | 2003-228631 | 8/2003 |
| JP | 2003228631 A * | 8/2003 |
| JP | 2003-264683 | 9/2003 |
| JP | 2003-283797 | 10/2003 |
| JP | 2004-048380 | 2/2004 |
| JP | 2004-104494 | 4/2004 |
| JP | 2005-026745 | 1/2005 |
| JP | 2005218033 | 8/2005 |
| JP | 2006-079348 | 3/2006 |
| JP | 2006-166155 | 6/2006 |
| JP | 2006345017 | 12/2006 |
| WO | WO 2007/069475 | 6/2007 |

OTHER PUBLICATIONS

Search Report for corresponding European patent application No. 08152878.8-1522 dated May 20, 2008.

Office Action for counterpart Japanese patent application No. 2007-182256 issued Aug. 23, 2011.

Office Action for corresponding European patent application No. 08152878.8 dated Feb. 9, 2012.

* cited by examiner

FIG. 4

REQUIREMENTS FOR GENERATED IMAGE DATA
- ☐ Q1-1. DO NOT ALLOW COPYING
- ☐ Q1-2. TRACK INFORMATION LEAK POINT
- ☐ Q1-3. DETERMINE ORIGINAL DOCUMENT
- ☐ Q1-4. GIVE NOTICE OF CONFIDENTIAL DOCUMENT
- ☐ Q1-5. VERIFY MANIPULATION
- ☐ Q1-6. REDUCE EFFECTS ON ORIGINAL IMAGE
- ☐ Q1-7. REDUCE INFORMATION EMBEDMENT AREA AS MUCH AS POSSIBLE
  ...

USAGE PURPOSES OF GENERATED IMAGE DATA
- ☐ Q2-1. WRITE SOMETHING BY HAND
- ☐ Q2-2. DISTRIBUTE EXTERNALLY
- ☐ Q2-3. DISTRIBUTE INTERNALLY
- ☐ Q2-4. DISTRIBUTE WIDELY
- ☐ Q2-5. STORE
- ☐ Q2-6. FOR WORK
  ...

| | COPY RESTRICTION | TRACE | INSERTION CHARACTERS | MANIPULATION DETECTION | APPEARANCE | INFORMATION VOLUME | REQUIRED AREA | EMBEDMENT TIME | RETRIEVAL TIME | CUTTING RESISTANCE | EMBEDMENT STRENGTH |
|---|---|---|---|---|---|---|---|---|---|---|---|
| Q1-1 | 5 | | 4 | | | | | | | 4 | |
| Q1-2 | | 5 | | | | 4 | | | | 4 | 5 |
| Q1-3 | | | 5 | | | | 4 | | | 4 | |
| Q1-4 | | | 5 | | | | | | | | |
| ⋮ | | | | ⋮ | | | | | | | ⋮ |
| Q2-1 | 3 | | 3 | | 4 | 4 | | | | | |
| Q2-2 | 5 | 5 | 4 | | 5 | 4 | | | | | |
| Q2-3 | | 5 | | | 3 | | | | | 4 | 4 |
| Q2-4 | | | | | | | | 4 | | | |

FIG. 7

| | MAIN FUNCTIONS | | | ADDITIONAL FUNCTIONS | | | | | | |
|---|---|---|---|---|---|---|---|---|---|---|
| | COPY RESTRICTION | TRACE | INSERTION CHARACTERS | MANIPULATION DETECTION | APPEARANCE | INFORMATION VOLUME | REQUIRED AREA | EMBEDMENT TIME | RETRIEVAL TIME | CUTTING RESISTANCE | EMBEDMENT STRENGTH |
| METHOD A | ○ | × | ○ | × | × | × | × | ○ | × | ○ | × |
| METHOD B | ○ | ○ | ○ | × | × | △ | × | △ | × | ○ | ○ |
| METHOD C | × | ○ | × | × | ○ | △ | △ | × | ○ | ○ | ○ |
| METHOD D | × | × | × | ○ | △ | ○ | × | △ | △ | ○ | △ |

FIG. 10

RECOMMENDED INFORMATION EMBEDMENT METHODS

| METHOD NAME | FUNCTIONS | EVALUATION VALUE (MAX1) |
|---|---|---|
| ● METHOD B | COPY RESTRICTION AND TRACE ARE AVAILABLE. TINT BLOCKS ARE ENTIRELY SUPERIMPOSED ON THE IMAGE. | 0.88 |
| ○ METHOD C | TRACE IS AVAILABLE. EMBEDDED INFORMATION IS INVISIBLE. | 0.75 |
| ○ METHOD A | TRACE IS AVAILABLE. EMBEDDED INFORMATION IS INVISIBLE. INFORMATION EMBEDMENT REQUIRES LONG TIME. | 0.71 |

SELECT ONE FROM INFORMATION EMBEDMENT METHODS AND CLICK "EMBED" BUTTON. OTHERWISE, CLICK "RETURN" BUTTON TO SET INFORMATION EMBEDMENT CONDITIONS.

[ EMBED ]    [ RETURN ]

FIG. 11

| COPY RESTRICTION | TRACE | INSERTION CHARACTERS | MANIPULATION DETECTION | APPEARANCE | INFORMATION VOLUME | REQUIRED AREA | EMBEDMENT TIME | RETRIEVAL TIME | CUTTING RESISTANCE | EMBEDMENT STRENGTH |
|---|---|---|---|---|---|---|---|---|---|---|
| ○ | ○ | ○ | × | × | ○ | ○ | × | × | ○ | ○ |

FIG. 13

|  | COPY RESTRICTION | TRACE | INSERTION CHARACTERS | MANIP- ULATION DETECTION | APPEARANCE |
|---|---|---|---|---|---|
| CONTRACT DOCUMENTS |  |  |  | ○ |  |
| RECEIPTS |  |  |  | ○ |  |
| DISTRIBUTION DOCUMENTS | ○ | ○ | ○ |  | ○ |
| HUMAN RESOURCES | ○ | ○ |  | ○ |  |
| CUSTOMER INFORMATION | ○ | ○ | ○ |  |  |

IMAGE PROCESSING APPARATUS, IMAGE PROCESSING METHOD, AND PROGRAM PRODUCT

CROSS-REFERENCE TO RELATED APPLICATIONS

The present patent application claims priority under 35 U.S.C. §119 from Japanese Patent Application No. 2007-071283, filed on Mar. 19, 2007, and No. 2007-182256, filed on Jul. 11, 2007 in the Japan Patent Office, the entire contents and disclosure of which are hereby incorporated by reference herein.

BACKGROUND OF THE INVENTION

1. Field of the Invention

Preferred embodiments of the present invention generally relate to an information embedment manner, and more particularly, to an image processing apparatus, an image processing method, and a program product that embed information in image data.

2. Discussion of the Related Art

Recent trends toward converting information into electronic data show no signs of abating, and image forming apparatuses and image processing apparatuses, such as printers, facsimiles, and so forth, have been indispensable in outputting information converted into electronic format.

Typically, such an image processing apparatus is configured as a composite apparatus that can be employed as a printer, a facsimile, a scanner, a copier, or the like, by including shooting, image formation, communications, and other such capabilities. In such an image processing apparatus, a commonly known technique to embed supplemental information in image data is employed to control copying of digital data, to associate digital data with printed data, and so forth, and a variety of methods to embed information in image data have been proposed.

For example, a method to embed information in image data by using spaces between characters, a method to superimpose a visible dot pattern on image data, and a method to embed information invisibly by modifying a background image of original image data are commonly known. It is to be noted that a method to embed information in image data is required to be selected based on the type of information and the intended use or purpose of image data to be generated by embedding the information.

For example, a technique to select an appropriate information embedment method has been proposed. In the technique, image data is converted into frequency components and an appropriate information embedment method is selected depending on data volume of high-frequency components.

In addition, another technique has been proposed in which a copyright protection mode or a manipulation detection mode is selected in embedding information in original image data, and strength of information embedment varies according to the selected mode.

However, these techniques have a drawback in that there is no way to ensure that the most appropriate information embedment method is selected. By embedding information in original image data, a variety of functions, such as copy restriction, trace, manipulation detection, and so forth, are provided depending on the purpose for which image data is to be generated by embedding the information. A selected information embedment method using the above-described techniques may not satisfy those functions required by a user.

At the same time, even when an appropriate information embedment method is selected, because an information volume of embedment information varies depending on information embedment methods, when the image data does not have enough area to include the embedment information, the embedment information cannot be embedded in the image data. Furthermore, even when embedment information is embedded in image data, the embedded information may affect generated image data depending on the way in which the embedded information is embedded.

On the other hand, another technique to embed required information in image data by applying image processing to original image data has been proposed. In this technique, when required information cannot be embedded in image data, the required information is forcibly embedded in image data by degrading image quality or resistance of generated image data. However, this technique is limited to enforced embedment of invisible information, and visible information cannot be embedded forcibly.

Further, another technique to embed required information in image data by image-processing original image data has been proposed. In this technique, required information is embedded in spaces between characters on a document image of image data. However, when image data cannot include required information, the required information cannot be forcibly embedded in the image data.

SUMMARY OF THE INVENTION

The present invention describes an image processing apparatus configured to embed embedment information in image data, which, in one preferred embodiment, includes an embedment information acquisition unit configured to acquire embedment information to be embedded in image data, an information embedment manner determination unit configured to determine an information embedment manner to embed the embedment information according to one of the acquired embedment information and image data to be generated by embedding the acquired embedment information in the image data, and an information embedment unit configured to embed the acquired embedment information in image data according to the information embedment manner determined by the information embedment manner determination unit.

The present invention further describes image processing method to embed embedment information in image data, which, in one preferred embodiment, includes the steps of acquiring embedment information to be embedded in the image data, determining an information embedment manner to embed the embedment information according to one of the acquired embedment information and image data to be generated by embedding the acquired embedment information in the image data, and embedding the acquired embedment information in image data according to the determined information embedment manner.

The present invention further describes an image processing program product, which, in one preferred embodiment, includes the steps of acquiring embedment information to be embedded in the image data, acquiring usage property information about a usage property of image data to be generated by embedding the acquired embedment information in the image data, generating an information embedment manner determination condition to determine the information embedment manner based on the usage property information, selecting a plurality of information embedment manners including available function item information in which an available function item provided by each information embedment manner is stored based on the generated information embedment manner determination condition, determining one information embedment manner based on the information embedment manner determination condition and available function item information, and embedding the acquired embedment information in image data according to the determined information embedment manner.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is an example screen to specify a usage property of generated image data displayed on a display panel;

FIG. 5 is a check item summation table that provides several points to each check item shown in FIG. 4;

FIG. 7 is a method-specific function item table according to the first embodiment;

FIG. 10 is an information embedment method selection screen displayed on the display panel;

FIG. 11 is an information embedment condition table corresponding to the information embedment condition histogram shown in FIG. 6;

FIG. 13 is a table of function items with respect to each document type of a fifth embodiment according to the present invention;

DETAILED DESCRIPTION OF THE PREFERRED EMBODIMENTS

Figure 1:
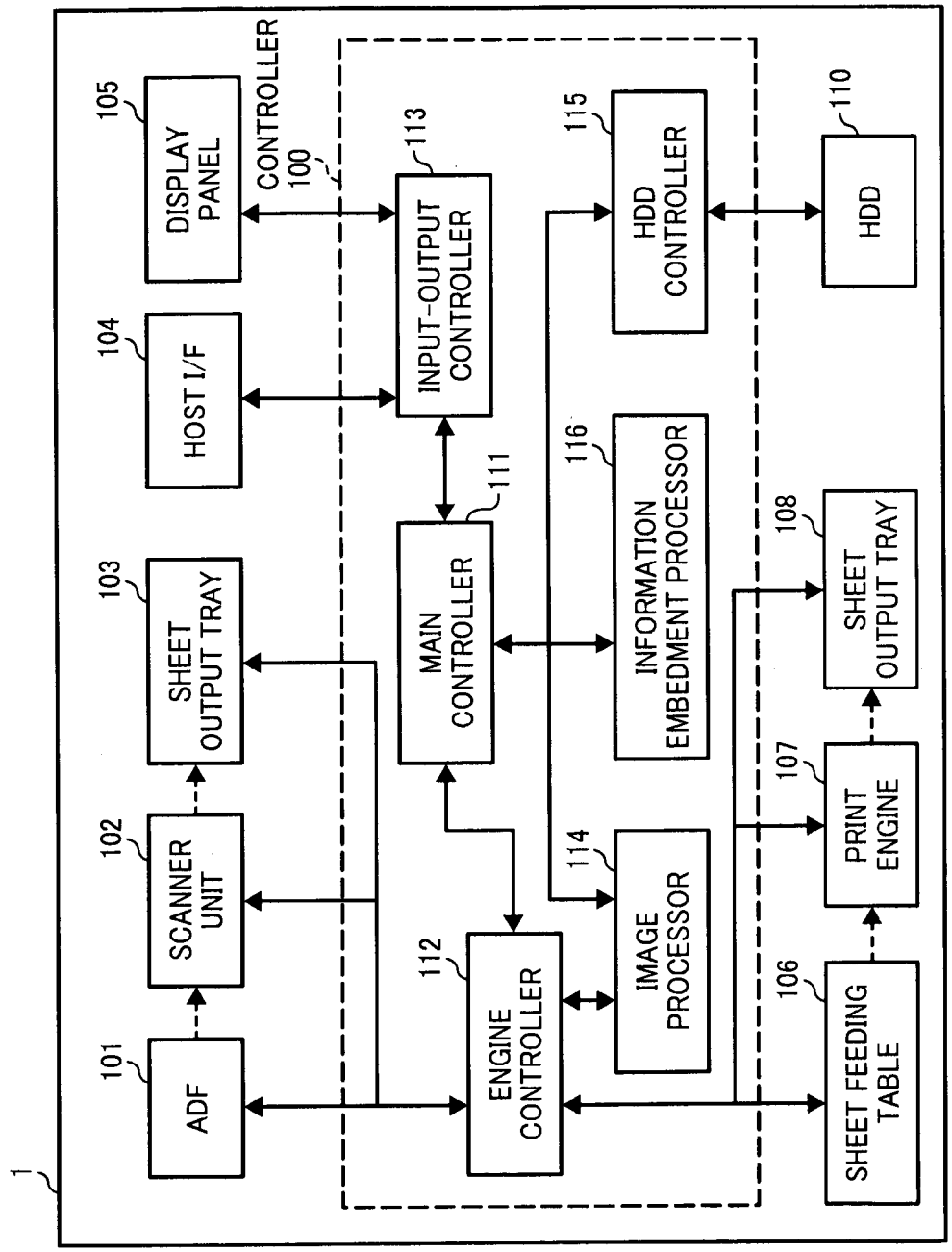
FIG. 1 is a block diagram showing an entire configuration of an image processing apparatus of a first embodiment according to the present invention.

In describing preferred embodiments illustrated in the drawings, specific terminology is employed solely for the sake of clarity. It should be noted that the present invention is not limited to any preferred embodiment described in the drawings, and the disclosure of this patent specification is not intended to be limited to the specific terminology so selected. It is to be understood that each specific element includes all technical equivalents that operate in a similar manner and achieve a similar result.

Referring now to the drawings, wherein like reference numerals designate identical or corresponding parts throughout the several views, preferred embodiments of the present invention are described.

The present invention determines whether or not a plurality of information embedment methods are appropriate when embedment information is embedded to image data based on information, which is input by a user, about a usage purpose of the embedment information, an application purpose of an image after embedment of the embedment information, and a request to the image.

FIG. 1 is a block diagram showing an entire configuration of an image processing apparatus 1 of a first embodiment according to the present invention. The image processing apparatus 1 includes a controller 100, an auto document feeder (ADF) 101, a scanner unit 102, a sheet output tray 103, a host interface (I/F) 104, a display panel 105, a sheet feeding table 106, a print engine 107, a sheet output tray 108, and a hard disk drive (HDD) 110. The controller 100 includes a main controller 111, an engine controller 112, an input-output controller 113, an image processor 114, an HDD controller 115, and an information embedment processor 116. In FIG. 1, solid-line arrows indicate electrical connections, and broken-line arrows indicate flows of a sheet of paper or a bundle of documents.

The host I/F 104 is an interface used in communications between the image processing apparatus 1 and other apparatuses such as a host apparatus or the like. A print task instructed by the host apparatus is input into the controller 100 through the host I/F 104, and then image formation based on the print task is carried out according to control of the controller 100. The display panel 105 is an output interface to display a state of the image processing apparatus 1 and also an input interface to serve as a touch panel when a user directly operates the image processing apparatus 1.

A configuration of the controller 100 is formed by combining software and hardware, more specifically, formed of a software controller and hardware such as an integrated circuit. In the software controller, a control program such as firmware or the like, which is stored in a nonvolatile storage medium such as a ROM (Read Only Memory), an EEPROM (Electronically Erasable and Programmable ROM), the HDD 110, an optical disk, or the like, is loaded into a volatile memory such as a DRAM (Dynamic Random Access Memory) or the like. The software controller controls the control program according to control of a CPU (Central Processing Unit). The controller 100 entirely controls the image processing apparatus 1.

The main controller 111 sends an instruction to each unit included in the controller 100 to control each unit. The engine controller 112 controls or drives the print engine 107, the scanner unit 102, and so forth. The input-output controller 113 inputs a print task sent through the host I/F 104 or operation information input by a user through the display panel 105 into the main controller 111. At the same time, the input-output controller 113 displays information on the display panel 105 according to an instruction by the main controller 111 or sends information to the host apparatus through the host I/F 104. The image processor 114 generates drawing information based on information included in the print task or a document stored in the HDD 110 according to control of the main controller 111. The drawing information is information for the print engine 107 to draw an image to be formed in an image forming operation thereof. The image processor 114 processes shot image data sent from the scanner unit 102 and generates image data. The image data is stored in the HDD 110 through the HDD controller 115 or sent to the host apparatus through the host I/F 104 as data obtained by scanning.

The HDD controller 115 controls information storage to and information reading from the HDD 110 according to the main controller 111. The HDD 110 stores image data input as a print task, read by the scanner unit 102, or the like, as a stored document, network address information of the host apparatus connected through the host I/F 104, an address book including destination information required for the image processing apparatus 1 to serve as a facsimile, a variety of setting values referred by the image processing apparatus 1 corresponding to a variety of operations thereof, and so forth. The information embedment processor 116 embeds embedment information in image data to be output as an image on a sheet of paper by the print engine 107 or image data read by the scanner engine 102. The information embedment processor 116 can embed embedment information according to a plurality of information embedment methods. A detailed description about the information embedment processor 116 is given below.

When the image processing apparatus 1 serves as a printer, the input-output controller 113 receives a print task through a USB (universal serial bus) or a LAN (local area network) connected to the host I/F 104. The main controller 111 receives a print task from the input-output controller 113 and causes the image processor 114 to perform image processing. Then, the image processor 114 generates drawing information based on image data included in the print task or a document stored in the HDD 110 in response to an instruction from the main controller 111. The drawing information generated by the image processor 114 is spooled in the HDD 110 sequentially. The engine controller 112 feeds a sheet of paper to the print engine 107 by driving the sheet feeding table 106 according to an instruction of the main controller 111. At the same time, the engine controller 112 reads the drawing information spooled in the HDD 110 and inputs the drawing information into the print engine 107. The print engine 107 carries out image formation based on the drawing information sent from the engine controller 112 onto the sheet of paper fed from the sheet feeding table 106. That is, the print engine 107 serves as an image forming unit. As an example mechanism of the print engine 107, an image forming mechanism by an ink-jet method, an electrophotographic method, or the like, can be employed. The sheet of paper after the image formation by the print engine 107 is output to the sheet output tray 108.

When the image processing apparatus 1 serves as a scanner, the input-output controller 113 sends a scanning execution signal to the main controller 111 in accordance with an operation of the display panel 105 by a user or a scanning execution instruction input from the external host apparatus through the host I/F 104. The main controller 111 controls the engine controller 112 in response to the scanning execution signal received from the input-output controller 113. The engine controller 112 drives the ADF 101 and conveys a document set on the ADF 101 to the scanner unit 102. Then, the engine controller 112 shoots the document conveyed from the ADF 101 by driving the scanner unit 102. When a document is set on the scanner unit 102 instead of the ADF 101, the scanner unit 102 shoots the document according to control of the engine controller 112. In other words, the scanner unit 102 serves as a shooting unit.

More specifically, a shooting device such as a CCD (Charge Coupled Device) or the like included in the scanning unit scans the document optically, and shot image data is generated based on optical information. The engine controller 112 sends the shot image data generated by the scanner unit 102 to the image processor 114. The image processor 114 generates image data based on the shot image data received from the engine controller 112 according to control of the main controller 111. The image data generated by the image processor 114 is spooled in the HDD 110 sequentially. The image data spooled in the HDD 110 is stored in the HDD 110 or sent to the external host apparatus through the input-output controller 113 and the host I/F 104 according to an instruction by a user.

Alternatively, when the image processing apparatus 1 serves as a copier, the image processor 114 generates drawing information based on shut image data that the engine controller 112 receives from the scanner unit 102 or image data generated by the image processor 114 and stored in the HDD 110. Then, the engine controller 112 drives the print engine 107 based on the drawing information similar to the above-described printing operation of the image processing apparatus 1.

Figure 2:
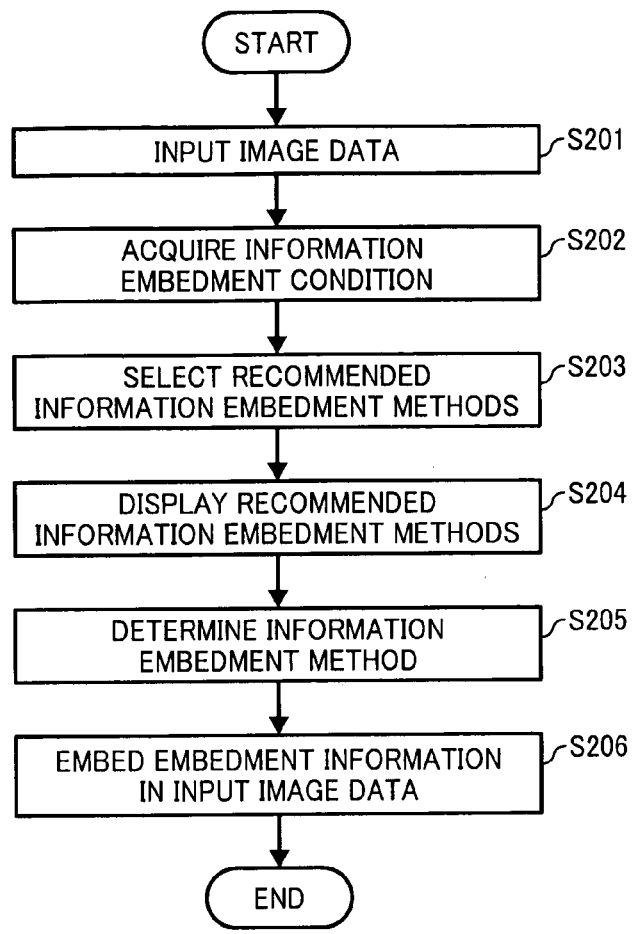
FIG. 2 is a flow chart showing an information embedment operation according to the first embodiment.

Next, an information embedment operation performed in the image processing apparatus 1 is explained. FIG. 2 is a flow chart showing an information embedment operation according to the first embodiment. First, image data in which information is embedded is input to the information embedment processor 116 (step S201). Then, the information embedment processor 116 acquires an information embedment condition (step S202). The information embedment condition is information about an effect obtained by embedding the embedment information. The information embedment processor 116 selects a recommended information embedment method among a plurality of information embedment methods based on the information embedment condition input thereto (step S203) and informs the main controller 111 of the recommended information embedment methods. Processing in steps S202 and S203 is described in detail below. The main controller 111 controls the input-output controller 113 and displays the information embedment method informed by the information embedment processor 116 on the display panel 105 (step S204).

A user verifies the recommended information embedment method displayed on the display panel 105 and determines an information embedment method to be employed by operating the display panel 105 (step S205). At this point, when a plurality of recommended information embedment methods is displayed on the display panel 105, the user determines one information embedment method therefrom. An instruction input by the user by operating the display panel 105 to determine the information embedment method is input to the main controller 111 through the input-output controller 113. The information embedment processor 116 recognizes the determination of the information embedment method by a notification from the main controller 111. When the information embedment method is determined, the information embedment processor 116 embeds the information in the image data input in step S201 (step S206) and the operation is terminated.

Figure 3:
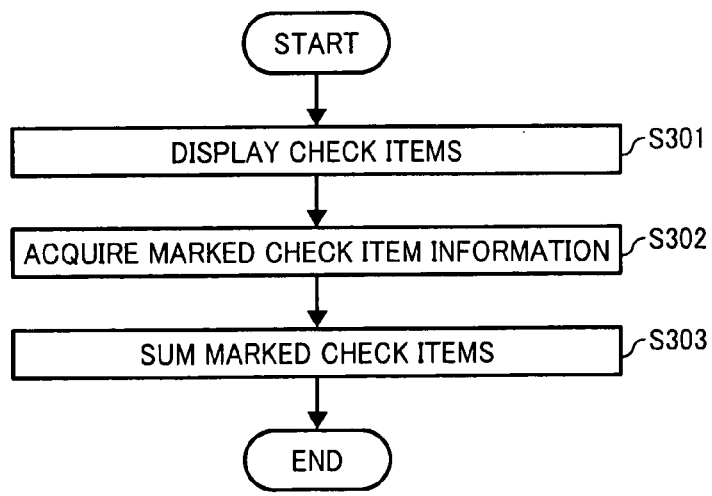
FIG. 3 is a flow chart showing an acquisition operation of an information embedment condition described in step S202 of FIG. 2.

Next, an acquisition operation of the information embedment condition described in step S202 of FIG. 2 is explained with reference to a flow chart shown in FIG. 3. Prior to acquisition of the information embedment condition, check items about a usage property of image data to be generated by embedding the acquired embedment information in the input image data are displayed on the display panel 105 (step S301). FIG. 4 shows an example screen to specify a usage property of generated image data displayed on the display panel 105. As shown in FIG. 4, a screen to specify a usage property of generated image data according to the first embodiment includes check items to specify a request for generated image data and check items to specify a usage purpose of the generated image data. The request for the generated image data is also a usage purpose of the embedment information. The user marks an appropriate checkbox with respect to each check item and touches an "OK" button provided in a lower side of the screen. Thereby, usage property information is input to the input-output controller 113 through the display panel 105. Then, the information embedment processor 116 acquires the usage property information sent from the main controller 111 (step S302). The display panel 105, the input-output controller 113, the main controller 111, and the information embedment processor 116 serve as a unit to acquire the usage property information.

When acquiring the usage property information, the information embedment processor 116 refers to a check item summation table and sums a check item of which checkbox has been marked by the user (step S303). FIG. 5 shows a check item summation table that provides several points to each check item described above. As shown in FIG. 5, the check item summation table is formed of the check items shown in FIG. 4 and function items that are obtained by embedding the embedment information in the input image data. Several points are assigned to each function item required for each check item. For example, when check item Q1-1 of "do not allow copying" is marked by the user among the check items shown in FIG. 4, several points are assigned to respective function items of "copy restriction," "insertion characters," "required area," and "cutting resistance." In other words, in order to satisfy an request of "do not allow copying" by the user, the check item summation table shown in FIG. 5 indicates that the functions of "copy restriction," "insertion characters," "required area," and "cutting resistance" are required to be added to the input image data by embedding the embedment information.

At the same time, in the check item summation table shown in FIG. 5, different points are assigned to respective function items. For example, as for the function item of "insertion characters," when check item Q1-1 of "do not allow copying" is marked, four points are assigned thereto. On the other hand, when check item Q1-3 of "determine original document" is marked, five points are assigned to the function item of "insertion characters". Thereby, a function required to achieve each check item can be determined more appropriately.

Then, the function items shown in FIG. 5 are described in detail. The function item of "copy restriction" is a function to embed information indicating that copy is not allowed to the image data. An information embedment method is not limited to one method, and the function item can be achieved by a plurality of information embedment methods.

The function item of "trace" is a function to embed embedment information such as a user identifier, a document identifier, a date, identification information of an output apparatus (for example, a serial number, a MAC (Media Access Control) address, an IP (Internet Protocol) address, and so forth), and so forth, into the image data. When the image data is leaked, a source of the information leakage can be tracked.

The function item "insertion characters" is a function to cause a predetermined image or character to emerge on an image when the image is copied by adding a predetermined dot pattern to input image data. Thereby, an original document in which the image is used can be determined, and document forgery can be prevented.

The function item of "Manipulation Detection" is a function to detect manipulation of the image data based on predetermined manipulation detection information by entirely adding the manipulation detection information to input image data. The manipulation can be detected by examining whether or not the manipulation detection information is embedded to the input image data that is required to include the manipulation detection information.

The function item of "appearance" is a function to visually maintain an appearance of original input image data after embedding embedment information. The less the embedment information affects the original input image data visually, the better the appearance of image data in which the embedment information is embedded becomes. For example, when check item Q1-6 of "reduce effects on original image" or check item Q2-2 of "distribute externally" is marked by the user among the check items shown in FIG. 4, several points are assigned to the function item of "appearance." The points assigned to the function item of "appearance" determine whether the embedment information embedded in the original input image data is visible or invisible. The first embodiment includes three options of "visible," "anti-visible," and "invisible," and one of the three options is selected depending on the points assigned to the function item of "appearance." The three options are described in detail below.

The function item of "information volume" is related to the volume of embedment information. In the first embodiment, when a check item in which a large amount of memory is required in embedding the embedment information is marked by a user among the check items shown in FIG. 4, several points are assigned to the function item of "information volume." Alternatively, when an amount of the embedment information is reduced, several points can be assigned to the function item of "information volume."

The function item of "required area" is related to an information embedment area of original input image data in which embedment information is embedded. In the first embodiment, when a check item requiring to reduce the information embedment area is marked by a user among the check items shown in FIG. 4, several points are assigned to the function item of "required area." Alternatively, several points can be assigned to the function item of "required area" when a large information embedment area is required.

The function item of "embedment time" is related to a time period required for the information embedment processor 116 to embed embedment information in input image data in step S206 of the flow chart shown in FIG. 2. In the first embodiment, when a check item requiring to promptly embed the embedment information in the input image data is marked by a user among the check items shown in FIG. 4, several points are assigned to the function item of "embedment time." For example, when check item Q2-4 of "distribute widely" marked by a user among the check items shown in FIG. 4 and different identification numbers are added to respective documents, image processing different from respective documents is required to be performed to generate drawing information for respective documents. In this example, when an information embedment method taking a long time period is selected, an extremely long time period is required to complete printing all the documents. When an information embedment method taking a short time period is selected, a time period required to complete printing all the documents may be shorter.

The function item of "retrieval time" is related to a time period required to read embedment information in generated image data in which the embedment information is embedded by referring to the generated image data. In the first embodiment, when a check item requiring to retrieve the embedment information from the generated image data promptly is marked by a user among the check items shown in FIG. 4, several points are assigned to the function item of "retrieval time."

The function item of "cutting resistance" is resistance to removal of embedment information when generated image data in which the embedment information is embedded is printed on a sheet of paper and a part of the sheet is cut with scissors or the like. The function item of "cutting resistance" is also resistance to cutting of embedment information by deleting a part of generated image data electronically. For example, when embedment information is embedded in image data with a bar code or the like, the embedment information embedded in the image data may become invalid by cutting the bar code. In the first embodiment, when a check item requiring resistance to invalidation of embedment information by removing a part of generated image data is marked by a user among the check items shown in FIG. 4, several points are assigned to the function item of "cutting resistance."

The function item of "embedment strength" is related to a retrieval ratio, the number of interleave, a parity bit length for a parity check, and so forth, used for reading embedment information in generated image data in which the embedment information is embedded by referring to the generated image data. For example, when a printed image is copied repeatedly or electronic image data is converted or filtered, an original image deteriorates gradually. "Embedment strength" determines whether or not the embedment information can be retrieved from such a deteriorated image. In the first embodiment, when a check item requiring validation of embedment information even if an image of generated image data is copied or converted repeatedly is marked by a user among the check items shown in FIG. 4, several points are assigned to the function item of "embedment strength."

Figure 6:
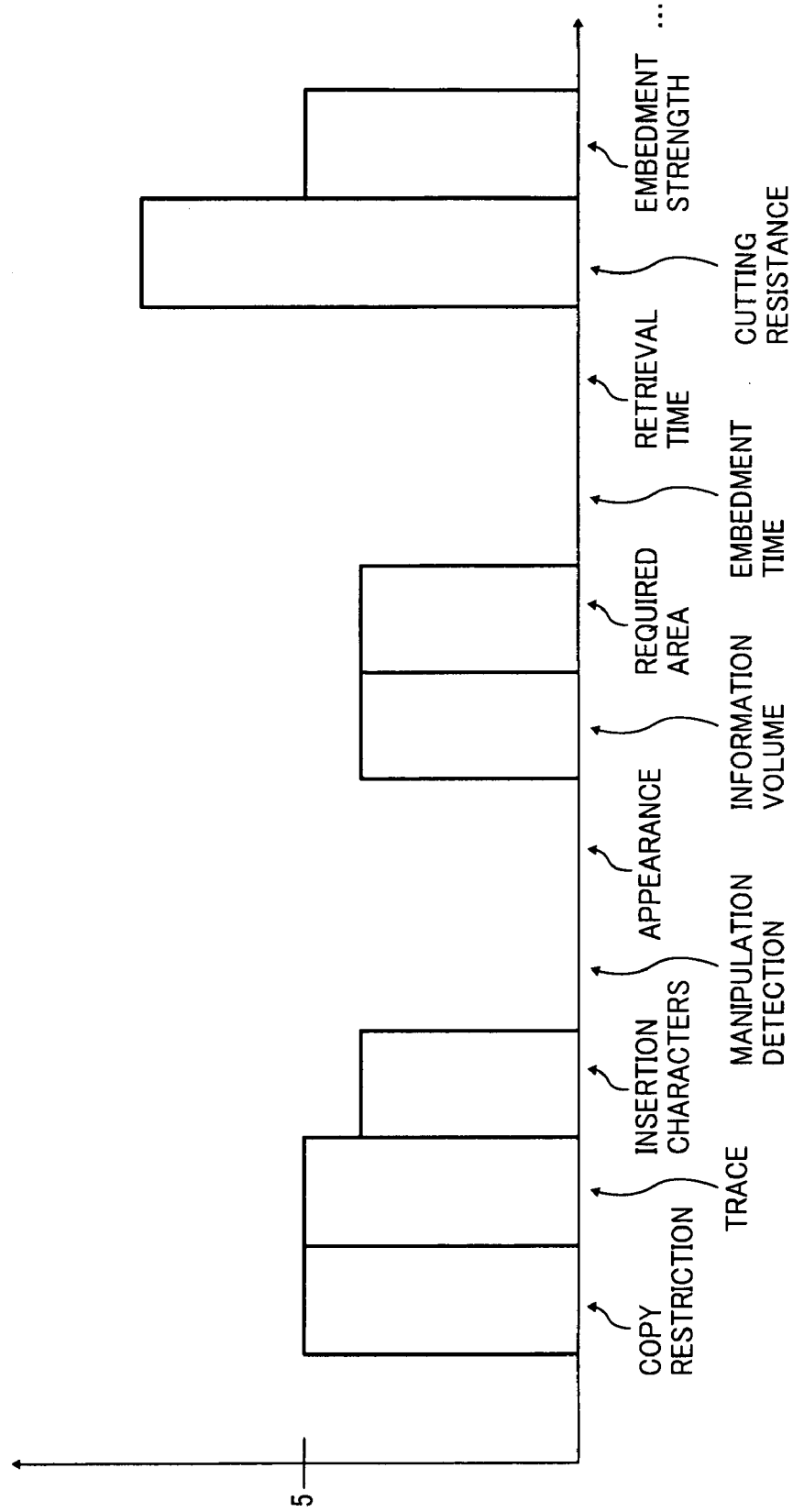
FIG. 6 is an information embedment condition histogram showing a summation result of function items.

The information embedment processor 116 assigns several points to each function item as shown in FIG. 5 according to a check item marked by a user among the check items shown in FIG. 4 and sums the points. FIG. 6 is a histogram showing a summation result of function items, in other words, an information embedment condition histogram. In FIG. 6, an example is shown when check item Q1-1 of "do not allow copying" and check item Q1-2 of "track information leak point" is marked by a user. FIG. 6 shows a summation result of points assigned to respective function items according to a check item marked by a user, and the summation result also indicates a request by the user in embedding embedment information in input image data. In other words, the histogram shown in FIG. 6 shows a condition required to be satisfied when embedment information is embedded in input image data and is used as an information embedment method determination condition to determine an information embedment method. As described above, an information embedment condition is obtained.

Next, selection of a recommended information embedment method of step S203 of the flow chart shown in FIG. 2 is described. The information embedment processor 116 refers to a method-specific function item table stored therein in selecting an information embedment method. FIG. 7 shows a method-specific function item table according to the first embodiment. As shown in FIG. 7, the method-specific function item table according to the first embodiment is formed of information embedment methods and function items. An availability factor of each function item with respect to each information embedment method is shown with a symbol of "○," "AΔ" or "X." In other words, the method-specific function item table according to the first embodiment shows an effect obtained by using each information embedment method. That is, the method-specific function item table is used as available function item information in which a function, an action, and an effect that each information embedment method can provide are stored.

Afterwards, an example of the information embedment method shown in FIG. 7 is described. In the first embodiment, as for the information embedment method, a technique to provide "copy restriction," "visible digital watermark," "invisible or anti-visible digital watermark," "insertion characters," "bar code," or the like, can be employed. The technique of "copy restriction" is a technique to restrict copying an image printed on a sheet of paper by embedding a predetermined mask pattern in the image. In the information embedment method using this technique, the predetermined mask pattern is easy to be embedded, and a mask unit is also installed easily to the image processing apparatus 1. However, in order to perform the copy restriction, a copier is required to support the copy restriction technique. The copy restriction technique depends on copiers, and appearance of an original image may deteriorate.

The technique of "visible digital watermark" is a technique to embed information by writing a mask pattern in image data. In this method, as the mask pattern, that is, the watermark, is visible, unauthorized processing can be eliminated. However, appearance of an original image may become inferior.

The technique of "invisible or anti-visible digital watermark" is a technique to embed information such that the information is invisible or difficult to be recognized different from the technique of "visible digital watermark." More specifically, a technique to modify a space in or a shape of one character or to slightly modify a gradation or a frequency of an image is employed to embed information in a document image. In the technique of "invisible or anti-visible digital watermark," as embedded information is invisible or difficult to be recognized, an appearance of the original image can be maintained. However, an amount of information that can be embedded in the document image is smaller than other methods.

The technique of "insertion characters" is a technique to embed a predetermined dot pattern in an original image such that when the original image is copied by a copier, a character, a symbol, or the like appears based on the embedded dot pattern, and a message indicating that a copied image is a duplicate is shown on the copied image. This technique of "insertion characters" does not depend on copiers different from the above-described copy restriction technique. However, the original image can be copied even though the appeared character or symbol, and an appearance of the original image may be inferior.

The technique of "bar code" is a technique to embed information as a graphic pattern in a margin of an original image or the like. More specifically, as the graphic pattern, a one-dimensional or two-dimensional graphic pattern can be employed. In the bar-code technique, an amount of information that can be embedded is lager than the other techniques. However, the embedded information can be removed easily by cutting the graphic pattern, and this technique does not have strong resistance to cutting.

It should be noted that the above-described techniques can be employed solely or in combination with the other techniques.

Figure 8:
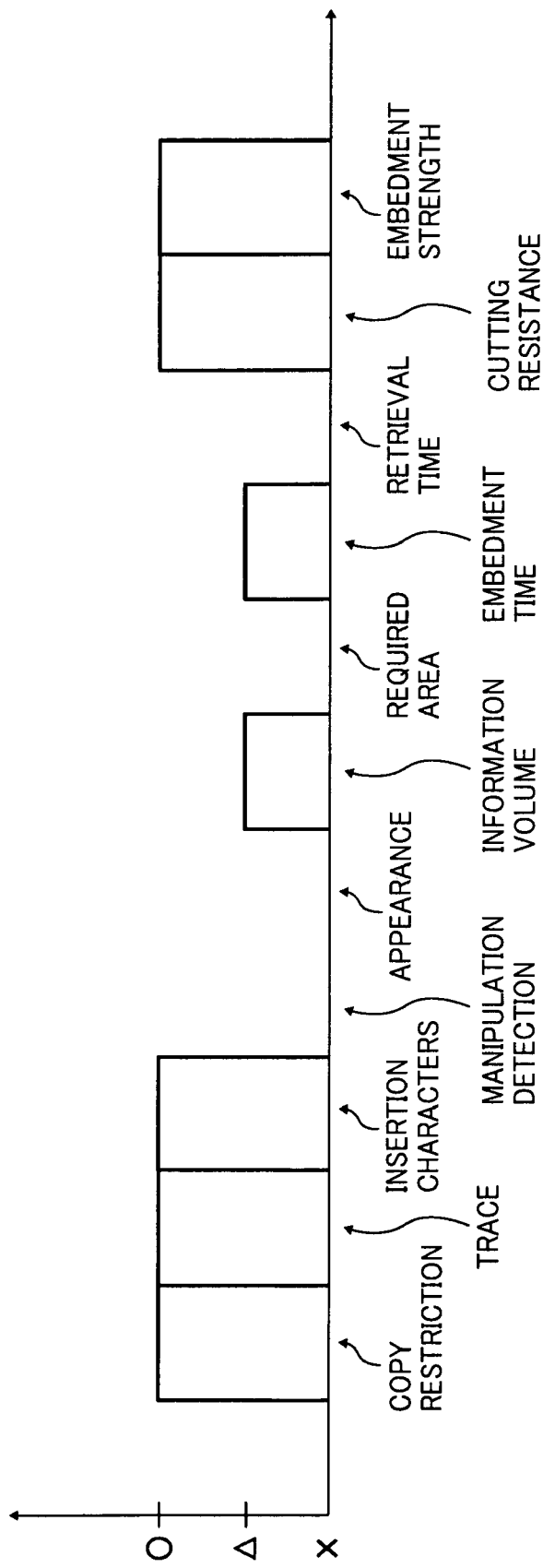
FIG. 8 is an available function item histogram of a method B in the method-specific function item table shown in FIG. 7.
Figure 9:
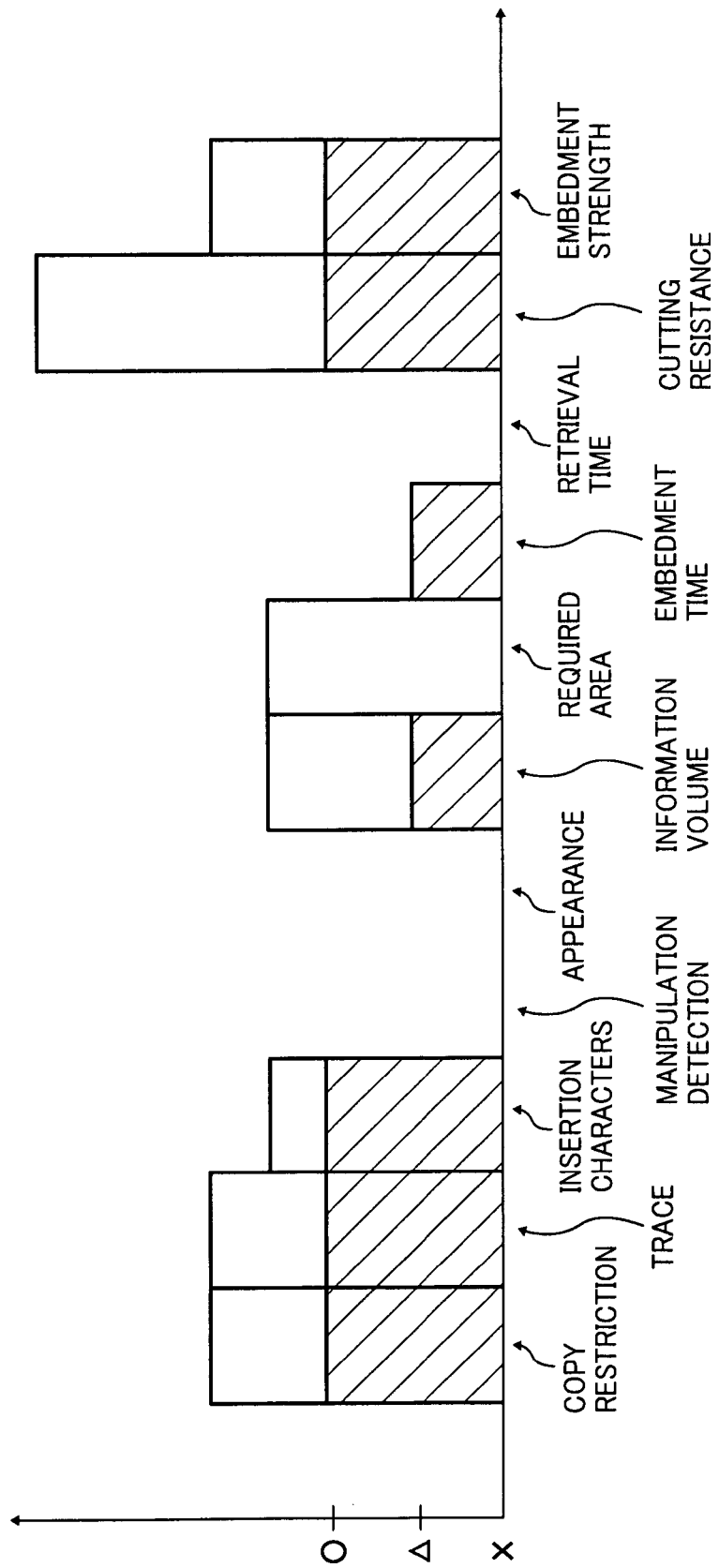
FIG. 9 is a histogram obtained by superposing the available function item histogram shown in FIG. 8 on the information embedment condition histogram shown in FIG. 6.

When an information embedment method is selected in step S203 in the flow chart of FIG. 2, the information embedment processor 116 refers to the method-specific function item table and generates a histogram of availability factors assigned to respective information embedment methods. FIG. 8 is a histogram of a method B in the method-specific function item table shown in FIG. 7. The information embedment processor 116 compares a histogram as shown in FIG. 8 that is obtained from a method-specific function item table as shown in FIG. 7, which is referred to as an available function item histogram, with an embedment condition histogram as shown in FIG. 6 that is obtained in step S202 of the flow chart shown in FIG. 2, and determines a evaluation value by calculating similarity between the available function item histogram and the embedment condition histogram. FIG. 9 shows a histogram obtained by superposing the available function item histogram shown in FIG. 8 on the embedment condition histogram shown in FIG. 6. In FIG. 9, the available function item histogram is shown with diagonal lines. The similarity between the available function item histogram and the embedment condition histogram is determined, for example, by calculating superposed areas thereof. The information embedment processor 116 selects an information embedment method of which evaluation value is equal to or more than a predetermined threshold value as a recommended information embedment method and removes an information embedment method of which evaluation value is less than the threshold value from candidate information embedment methods by determining the similarity with respect to each information embedment method stored in the method-specific function item table. As a result, the recommended information embedment method is selected.

FIG. 10 shows an information embedment method selection screen displayed on the display panel 105 in step S204 of the flow chart shown in FIG. 2 as a result of selection of the recommended information embedment method performed in step S203 of the flow chart shown in FIG. 2. In FIG. 10, information embedment methods selected as the recommended information embedment methods in step S203 are shown in decreasing order of evaluation value thereof. At the same time, characteristics of each information embedment method are related to functions and displayed with each information embedment method. Thereby, a user can promptly determine an appropriate information embedment method to be employed in embedding embedment information in input image data with reference to the functions. When the user selects one information embedment method and touches an "embedment" button while following an instruction displayed on the information embedment method selection screen shown in FIG. 10, the information embedment method is ultimately determined (step S205). In the first embodiment, the display panel 105, the input-output controller 113, the main controller 111, and the information embedment processor 116 also serve as an information embedment manner determination unit. When only one information embedment method is displayed on the information embedment method selection screen, the user selects agree or disagree with the displayed information embedment method on the display panel 105. The information embedment processor 116 embeds the embedment information in the input image data according to the information embedment method determined in step S205 (step S206). The information embedment processor 116 functions as an information embedment unit.

As described above, a user can easily select an appropriate information embedment method with the image processing apparatus 1 according to the first embodiment, even if a user does not know a variety of information embedment methods. The image processing apparatus 1 according to the first embodiment generates an information embedment condition including a purpose of information embedment, a request for information embedment processing, and so forth, based on usage property information input by a user. Then, according to the generated information embedment condition, recommended information embedment methods are selected. The user can determine one information embedment method that satisfies a request by the user for the information embedment including a plurality of function items.

Instead of the above-described processing according to the first embodiment, an example processing that several points are directly assigned to each information embedment method based on usage property information input by a user can be employed. In the example processing, several processing steps may be omitted in comparison with the first embodiment. However, when several points are directly assigned to each information embedment method and one information embedment method is selected based on the points, the information embedment method may have many points only from a certain function. That is, a problem may arise in that a request for information embedment by a user is not be satisfied with a plurality of functions. On the other hand, in the above-described selection processing according to the first embodiment, this problem can be avoided. Alternatively, when a request for information embedment by a user is limited to one function item, the selection processing according to the first embodiment can be simplified by employing the example processing. It should be noted that the selection processing can be determined depending on a request by a user.

Alternatively, as other example processing, when each check item shown in FIG. 4 corresponds to each information embedment method and a user marks any one of the check items, one information embedment method can be determined. Alternatively, when a user marks each one of the check items of "requirements for generated image data" and "usage purposes of generated image data," one information embedment method can be determined.

In the above description, in step S204 of the flow chart shown in FIG. 2, information embedment methods of which evaluation values are equal to or more than the predetermined threshold value are displayed as recommended information embedment methods on the display panel 105. Alternatively, all the information embedment methods can be displayed in decreasing order of evaluation value, or only one information embedment method having the highest evaluation value can be displayed.

In the above description, an example that a user determines one information embedment method and executes information embedment using the information embedment method is described with reference to FIG. 10. Alternatively, only one information embedment method having the highest evaluation value can be determined automatically to execute information embedment. Similarly, when only one information embedment method has an evaluation value more than the threshold value, information embedment can be executed automatically using the information embedment method.

In the above description, an example that evaluation values are calculated by comparing an available function item histogram with an information embedment condition histogram is described with reference to FIG. 9. More specifically, an area ratio of an available function item histogram to an information embedment condition histogram can be used as an evaluation value. Alternatively, a threshold value can be set to each function item of an information embedment condition histogram. In the embedment condition histogram, a symbol of "○," "Δ," or "X" is assigned to each function item of which value is equal to or more than the threshold value, less than the threshold value and more than zero, or zero, respectively. Thereby, an information embedment condition table as shown in FIG. 11 can be prepared and compared with the method-specific function item table shown in FIG. 7. FIG. 11 is an information embedment condition table corresponding to the information embedment condition histogram shown in FIG. 6. In the information embedment condition table shown in FIG. 11. the threshold value is set as 3.

For example, when a symbol of "Δ" is specified to a function item in the information embedment condition table shown in FIG. 11, provided that the corresponding function item in the method-specific function item table shown in FIG. 7 is represented with a symbol of "Δ" or "○," it is determined that an information embedment condition is satisfied. When a symbol of "○" is specified to a function item in the information embedment condition table shown in FIG. 11, provided that the corresponding function item in the method-specific function item table shown in FIG. 7 is represented with a symbol of "○," it is determined that an information embedment condition is satisfied. When the above-described determination is applied to each function item with respect to each information embedment method, a recommended information embedment condition can be selected. More specifically, a recommended information embedment method can be selected with the number of function items satisfying an information embedment condition, or an information embedment method can be removed from candidate information embedment methods when the information embedment method includes a function item not satisfying an embedment condition.

Alternatively, a summation result of points assigned to each check item shown in FIG. 4 can be represented as a line graph with a horizontal axis of function items and a vertical axis of summed points instead of an information embedment condition histogram as shown in FIG. 6. A method-specific function item table as shown in FIG. 7 can also be represented as a line graph similarly. A recommended information embedment method can be selected by applying pattern matching to both line graphs after mathematization.

In the above description, the method-specific function item table shown in FIG. 7 is represented with a symbol of "○," "Δ," or "X." Alternatively, the method-specific function item table can be represented with a numerical value.

In the above description, as shown in FIG. 2, information embedment processing from input of image data to the information embedment processor 116 to execution of information embedment is explained. As for an example to input image data to the information embedment processor 116, for example, a document stored in the HDD 110, an image or a document as a print task sent from a host apparatus, or an image scanned by a scanner unit 102 is input to the information embedment processor 116. A document stored in the HDD 110 is input by an operation of the display panel 105 by a user or an instruction from a host apparatus. When information embedment processing is performed by a host apparatus, the main controller 111 controls the input-output controller 113 based on a notification from the information embedment processor 116 and sends display information to display a screen as shown in FIG. 4 or 10 to the host apparatus through the host I/F 104.

When an image or a document is input as a print task from a host apparatus, the main controller 111 controls the input-output controller 113 based on a notification from the information embedment processor 116 and sends display information to display a screen as shown in FIG. 4 or 10 to the host apparatus through the host I/F 104, as well. Alternatively, when including an application of information embedment processing, a host apparatus can perform the same operation as the main controller 111.

When generated image data in which embedment information is embedded is input to the image processor 114, an image is formed from the generated image data. Alternatively, embedment information can be embedded in image data during generation of drawing image data by the image processor 114 instead of being embedded in the information embedment processor 116.

When image data is input as image data read by the scanner unit 102, a user performs scanning by operating the display panel 105. At this point, a screen as shown in FIG. 4 or 10 is displayed on the display panel 105, and the user determines an information embedment method.

Alternatively, the image processor 114 can perform image processing on shot image data input from the scanner unit 102 based on embedment information input to the image processor 114 and embed the embedment information in the shot image data instead of inputting image data processed by the image processor 114 to the information embedment processor 116 and embedding the embedment information in the image data in the information embedment processor 116.

Figure 12:
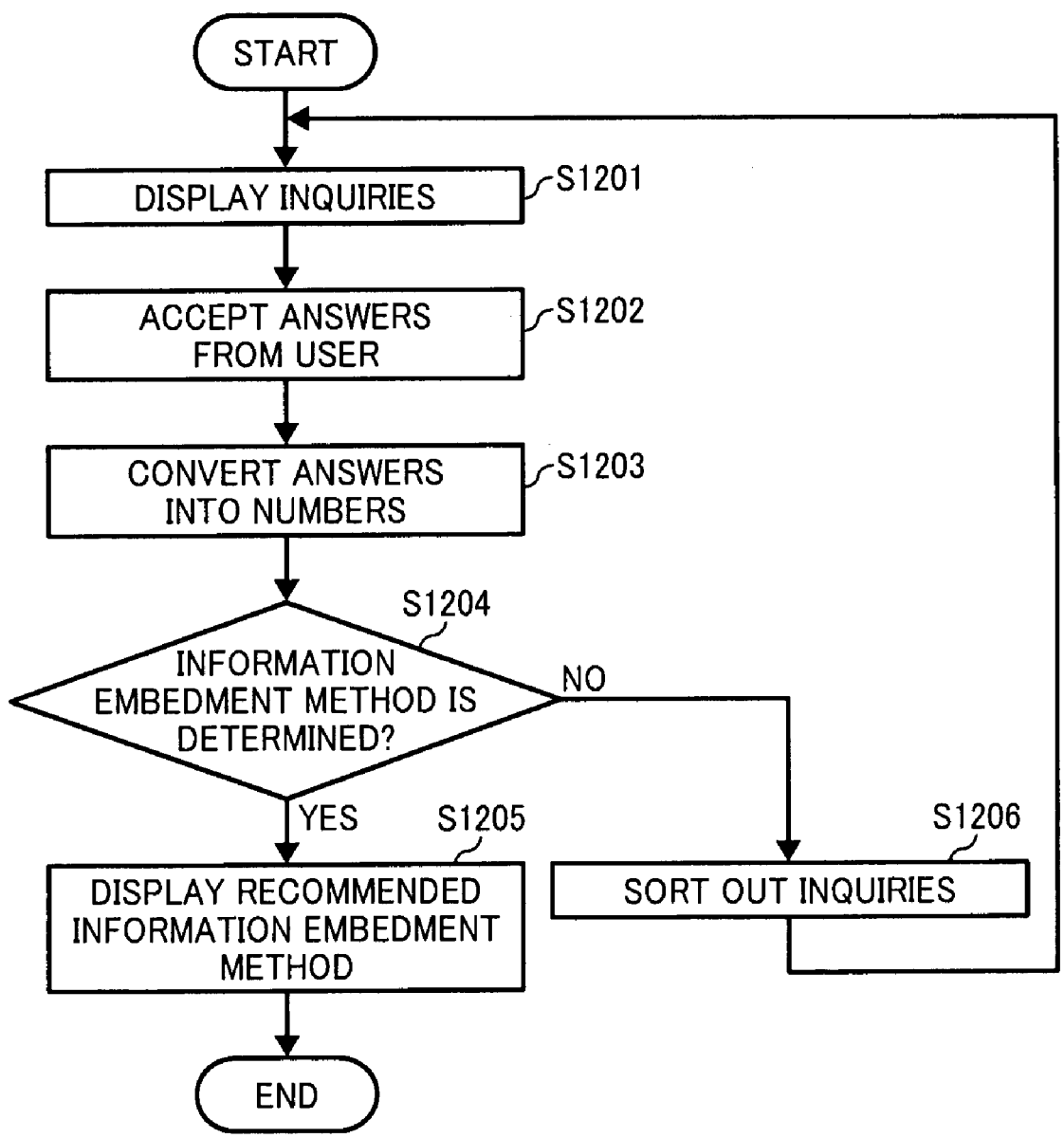
FIG. 12 is a flow chart showing processing of usage property information acquisition of a second embodiment according to the present invention.

In the first embodiment, as shown in FIG. 4, a user marks each checkbox of a plurality of check items to input usage property information. Occasionally, several combinations of the requirements for generated image data and the usage purposes of generated image data shown in FIG. 4 cannot be satisfied at a one time. When a user marks several checkboxes of which requirements or purposes cannot be satisfied at a one time, a problem may arise in that an appropriate information embedment method is not determined. In a second embodiment, the problem is solved by employing interactive processing from an input operation of usage property information to an acquisition operation of an information embedment condition. In the second embodiment, elements identical or equivalent to the elements shown in the first embodiment are represented by the same reference numerals as in the first embodiment and a description thereof is omitted herein. FIG. 12 is a flow chart showing an input operation of usage property information, an acquisition operation of an information embedment condition, and a selection operation of an information embedment method according to the second embodiment. These operations of the flow chart shown in FIG. 12 correspond to operations performed in steps S202, S203, and S204 of the flow chart shown in FIG. 2.

According to the second embodiment, as shown in FIG. 12, when usage property information is input, any one of check items of the requirements for generated image data among the check items shown in FIG. 4 is shown on the display panel 105 as an inquiry (S1201). That is, a plurality of inquiries is shown at a plurality of times separately. A user answers to each displayed inquiry by inputting "Yes" or "No" thereto while operating the display panel 105 (step S1202). The answers from the user are sent to the information embedment processor 116 through the main controller 111. The information embedment processor 116 converts the answers into numbers with reference to the check item summation table shown in FIG. 5 (step S1203) and generates an information embedment condition.

When the information embedment condition is generated, the information embedment processor 116 refers to the method-specific function item table shown in FIG. 7 similar to the first embodiment and verifies whether or not only one information embedment method is specified (step S1204). When only one information embedment method is specified (step S1204: YES), the information embedment method is displayed as the recommended information embedment method on the display panel 105 as same as step S204 shown in FIG. 2 (step S1205), and the processing terminates. At this moment, it is preferable that characteristics of the information embedment method are displayed therewith. On the other hand, when only one information embedment method is not specified (step S1204: NO), the information embedment processor 116 removes several inquiries that includes contradictory functions or difficult functions to be performed by already specified information embedment methods from candidate inquiries based on the answers to the inquiries, which are displayed in step S1201, from the user in step S1202, and sends a next inquiry to the main controller 111 (step S1206). Then, processing from step S1201 is repeated until only one information embedment method is specified.

As described above, in the second embodiment according to the present invention, inquiries and answers to require a plurality of functions that cannot be obtained at a one time can be avoided from being displayed and sent, and an information embedment method can be selected appropriately. In the above description, a user input "Yes" or "No" with respect to each inquiry. Alternatively, contradictory inquiry items can be displayed at one time, a user can select any one of two or a plurality of contradictory inquiry items. In addition, by setting a display priority to each inquiry item, determination of an information embedment method without displaying an inquiry item that is related to a function required by a user can be avoided. As for the settings of a display priority to each inquiry item, for example, inquiry items related to function items for security such as a function item of "copy restriction," "trace," "insertion characters," or "manipulation detection" can be displayed by priority.

In the second embodiment, only one recommended information embedment method is selected. Alternatively, a plurality of recommended information embedment methods can be displayed after narrowing down candidate information embedment methods. For example, as described above, each of the inquiry items related to function items for security is displayed, and functions for security are narrowed down. Then, a plurality of recommended information embedment methods are displayed, and a user can determine one information embedment method based on characteristics of each information embedment method related to functions on a screen as shown in FIG. 10. Alternatively, a predetermined number of candidate information embedment methods can be set. When recommended information embedment methods are narrowed down less than the predetermined number, the recommended information embedment methods can be displayed.

In the first embodiment, the information embedment condition is obtained based on only the usage purpose information input by a user. In a third embodiment, more appropriate information embedment method can be selected by referring to information of input image data. In the third embodiment, elements identical or equivalent to the elements shown in the first embodiment are represented by the same reference numerals as in the first embodiment and a description thereof is omitted herein. Image data includes a variety of information such as information about an application that has prepared an image or a document, a text of the document, an image itself, and so forth. In the third embodiment, such information is also retrieved as usage purpose information and used for generation of an information embedment condition. Thereby, a user can determine an information embedment method more easily, and recommended information embedment methods are selected more appropriately. For example, when information about an application that has prepared an original image is included in original image data, an appropriate information embedment method is different depending on characteristics of each application such as a margin in printing or the like. In the third embodiment, an effect of the application can be considered when an appropriate information embedment method is selected. Alternatively, a usage purpose is predicted by extracting a key word such as "contract document" from text information of an original document, and the key word is used for selection of recommended information embedment methods.

More specifically, when a margin of a printed image or document is small, additional points can be assigned to the function item of "required area" in the check item summation table shown in FIG. 5. When the number of pages of an input image as an original image is large, additional points can be assigned to the function item of "embedment time." In addition, when a key word such as "contract document," "confidential," or the like, is extracted from text information of an original document, additional points can be assigned to the function item of "copy restriction," "trace," "insertion characters," "manipulation detection," or the like, that is related to security. As described above, in the third embodiment, a user can determine an information embedment method more easily or can determine a more appropriate information embedment method by referring to information obtained from original image data in addition to usage property information input by the user.

In the description above, an example that not only information input by a user but also information extracted from original image data is used for usage property information is explained. Alternatively, an information embedment method can be determined based on only information extracted from original image data. Thereby, an input operation by a user can be minimized, and selection of an inappropriate information method due to an inputting error by a user can be avoided.

In the first embodiment, points of each function item are summed based on the check item summation table shown in FIG. 5 by marking the check items shown in FIG. 4. In a fourth embodiment, when the points are summed, additional points are assigned to function items related to security. In the fourth embodiment, elements identical or equivalent to the elements shown in the first embodiment are represented by the same reference numerals as in the first embodiment and a description thereof is omitted herein. For example, in a document management method, a security level is preset to each document. When several points are assigned to each function item in the check item summation table shown in FIG. 5 based on a check item marked by a user on the screen shown in FIG. 4, an information embedment method appropriate for the security level can be selected by assigning points considering the security level. On the other hand, when an unnecessary high security level is set to a document by a selected information embedment method, other functions such as an appearance may not be satisfied. In the fourth embodiment, such a problem can be avoided.

When usage purpose information is input according to the fourth embodiment, a security level of an original document is set first. The security level of the original image can be set by a user or automatically based on contents of the original document. Alternatively, security level of an original document can be predicted from the check items shown in FIG. 4, when a user marks any one of the check items about "usage purposes of generated image data." For example, the security level can be set depending on distribution destinations. The security level can be assigned to each check item of "usage purposes of generated image data" as "high," "medium," or "low." When a check item of "high" is marked by a user, in assigning several points to the check item summation table shown in FIG. 5, function items such as "appearance" or "embedment time" that are not directly related to security are removed or receives fewer points, and function items required to improve a security level receives more points. For example, 50% or 70% of points that are already set in the check item summation table shown in FIG. 5 can be assigned to function items that are not directly related to security. When a check item of "medium" is marked by a user, points that are already set in the check item summation table shown in FIG. 5 are assigned to function items related to the check item as is. When a check item of "low" is marked by a user, fewer points are assigned to function items related to security, and more points are assigned to other function items such as "appearance" or "embedment time."

According to the fourth embodiment, the information embedment processor 116 can generate and obtain an information embedment condition based on a security level, and a user can determine a more appropriate information embedment method. As described above, when a security level of original image data is high, an information embedment condition appropriate for the security level can be obtained by assigning points to function items related to security.

Alternatively, after an information embedment condition is obtained, function items related to security can be emphasized during comparison of an available function item histogram with an embedment condition histogram as shown in FIG. 9. For example, when a security level of original image data is high, an evaluation value can be calculated by more emphasizing superposition of a function item related to security and less emphasizing superposition of a function item not related to security in comparing an available function item histogram with an embedment condition histogram as shown in FIG. 9.

In the fourth embodiment, an example in which additional points are assigned to function items based on a security level of original image data and function items related to security is emphasized or not emphasized is described. Alternatively, other function items can be emphasized according to a usage purpose of each original image data.

In the first embodiment, points of each function item are summed based on the check item summation table shown in FIG. 5 by marking the check items shown in FIG. 4. In a usage purpose information input method according to a fifth embodiment, a specific function item is set to be significant by causing a user to input a type of an original document. For example, a contract document or a receipt can be managed similarly considering security. A same information embedment method can be used for these documents, and function items required for such a document are limited. The information embedment processor 116 includes a table shown in FIG. 13, and a function item to be emphasized is determined according to a document type input by a user. Alternatively, a user can configure a table such as the table shown in FIG. 13.

In the fifth embodiment, a user is required only to input a type of an original document and selects several items if necessary. The information embedment processor 116 selects recommended information embedment methods by referring to the table shown in FIG. 13 based on the type of the original document input by the user, and the most appropriate information embedment method can be determined by using information obtained from the original document, embedment determination information, which is described in detail below, or the like. As a result, the user can determine an information embedment method more easily, and processing performed in the image processing apparatus 1 can be simplified.

As a result of comparing an available function item histogram with an embedment condition histogram as shown in FIG. 9, an information volume of original image data that can include embedment information is not enough in a relation between embedment information and an information embedment method, and an appropriate information embedment method may not be selected. Even if an information volume of original image data that can include embedment information is not enough, occasionally embedment information is required to be embedded in the original image data considering security. In such a case, according to an instruction by a user, the information embedment processor 116 can forcibly edit the original image data by performing image processing thereon so that the embedment information can be embedded in the original image data. Thereby, information embedment can be performed to satisfy the security level. Example processing of this case is described in detail with sixth and seventh embodiment below.

As described above, in the first, second, third, fourth, and fifth embodiments, examples that embedment information is embedded in original image data in the image processing apparatus 1 including the scanner unit 102, the print engine 107, and so forth. When embedment information is embedded in original image data and generated image data in which the embedment information is embedded is stored in the HDD 110 or is sent to a host apparatus through the host I/F 104, the scanner unit 102 and the print engine 107 are not always required. Thus, the image processing according to the present invention can be performed by operating an information processing apparatus as an image processing apparatus. It should be noted that the information processing apparatus is not limited to an image reading apparatus including a scanning unit, an image forming apparatus including a print engine, or a composite apparatus thereof.

Figure 14:
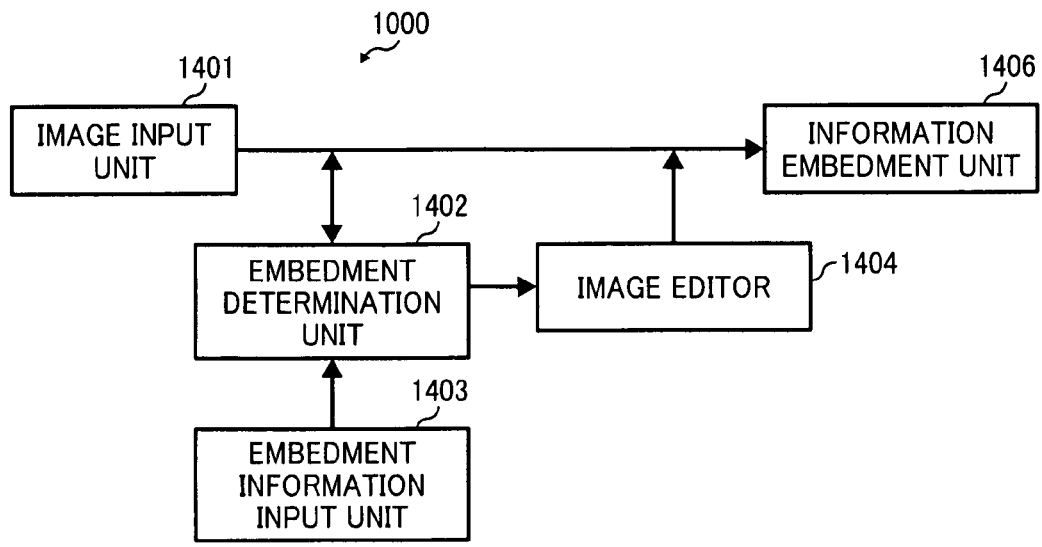
FIG. 14 is a block diagram showing configuration of an information embedment device of a sixth embodiment according to the present invention.
Figure 15:
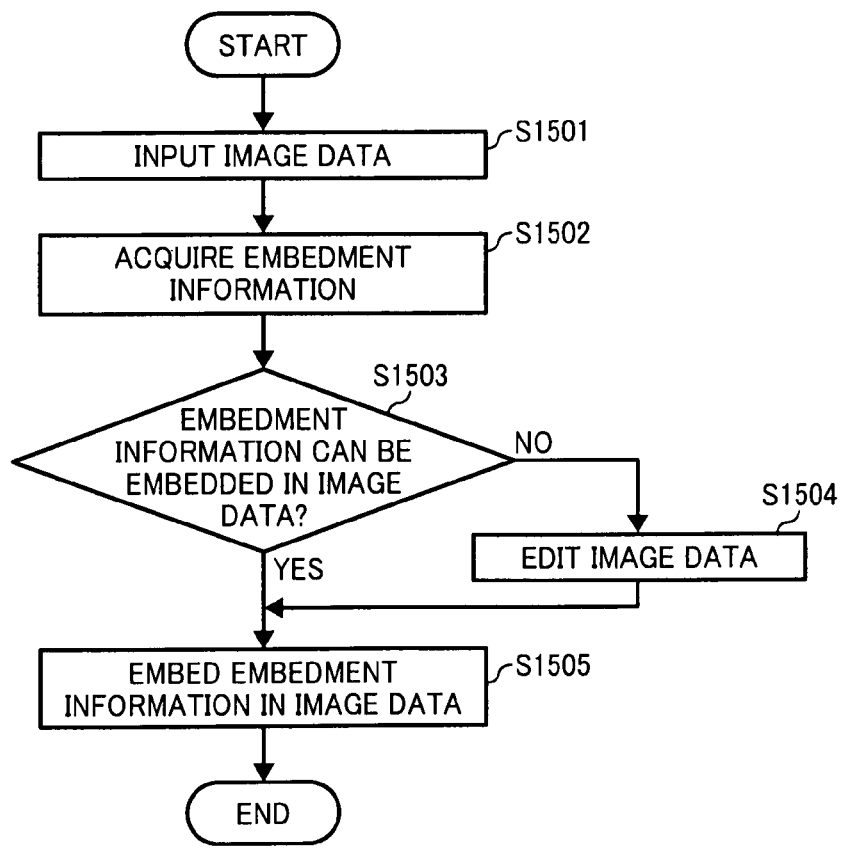
FIG. 15 is a flow chart describing entire processing by the information embedment device according to the sixth embodiment.
Figure 16:
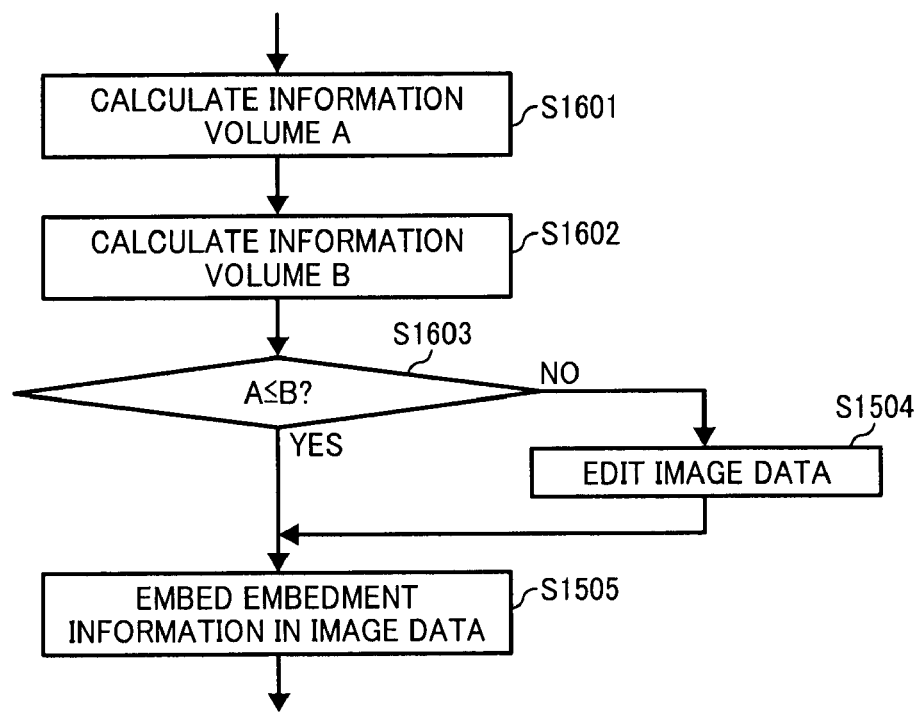
FIG. 16 is a flow chart describing processing in step S1503 of the flow chart shown in FIG. 15.

FIG. 14 is a block diagram showing configuration of an information embedment device 1000 of a sixth embodiment according to the present invention. The information embedment device 1000 according to the sixth embodiment can be included in or equivalent to the information embedment processor 116 of the image processing apparatus 1 according to the first, second, third, fourth, or fifth embodiment described above. FIG. 15 is a flow chart describing entire processing by the information embedment device 1000 according to the sixth embodiment. FIG. 16 is a flow chart describing processing to determine whether or not information can be embedded in step S1503 of the flow chart shown in FIG. 15 in detail.

The configuration of the information embedment device 1000 according to the sixth embodiment is explained with reference to FIG. 14. The sixth embodiment according to the present invention is applied to a facsimile and embeds embedment information in image data to be sent by the facsimile by embedding the embedment information in the image data. As shown in FIG. 14, the configuration of the information embedment device 1000 according to the sixth embodiment includes an image input unit 1401 such as a scanner or the like, an embedment determination unit 1402, an embedment information input unit 1403, an image editor 1404, and an information embedment unit 1406. A hardware configuration of the facsimile, which is not shown, includes a memory, a CPU, and so forth. The CPU executes the embedment determination unit 1402, the embedment information input unit 1403, the image editor 1404, and the information embedment unit 1406 that are configured by software and stored in the memory to employ functions thereof.

The entire processing of the information embedment device 1000 according to the sixth embodiment is explained with reference to the flow chart shown in FIG. 15.

First, image data to be sent by the facsimile is input from the image input unit 1401 such as a scanner or the like (step S1501). Then, embedment information is acquired from the embedment information input unit 1403 (step S1502). The embedment information can be any information such as an identification of a user that sends the image data from the facsimile, an identification of a user that receives the image data from the facsimile, confidential information required not to appear on the image data sent by the facsimile at a destination, or the like.

When the image data and the embedment information are input, the embedment determination unit 1402 determines whether or not the input embedment information can be embedded in the input image data (step S1503). This determination processing is described in detail with reference to FIG. 16 below.

When the embedment determination unit 1402 determines that the input embedment information cannot be embedded in the input image data (step S1503: No), the image editor 1404 edits the input image data to embed the acquired embedment information therein by forcibly applying image processing such as background removal, background image removal, or the like, to the input image data and enlarging a blank area (step S1504). Then, the information embedment unit 1406 embeds the acquired embedment information in image data edited by the image editor 1404 (step S1505), and the processing terminates.

When the embedment determination unit 1402 determines that the acquired embedment information can be embedded in the input image data (step S1503: Yes), the information embedment unit 1406 embeds the acquired embedment information in the input image data without the edit by the image editor 1404 (step S1505), and the processing terminates.

In step S1504, the image editor 1404 enlarges the blank area of the input image data by applying image processing such as background removal. As for the image processing, a method to enlarge the blank area by shifting an object image in the input image data can be employed. In the method, a blank area required to embed embedment information, for example, a square of 1 cm, is obtained by shifting an object image and so forth and gathering small blank areas to one point or a plurality of points. By using this method, the embedment information can be embedded in the gathered blank area, even when embedment information cannot be embedded in a square blank area of 5 mm. More specifically, a square of 1 cm can be obtained by shifting the object image to a left side and gathering blank areas of a right side and the left side, and an information embedment area can be enlarged.

Next, the embedment determination processing in step S1503 in the flow chart shown in FIG. 15 is described in detail with reference to a flow chart shown in FIG. 16.

The embedment determination unit 1402 calculates an information volume A of the acquired embedment information to be embedded in image data from an information volume of the acquired embedment information and an information embedment method to embed the acquired embedment information in the input image data (step S1601). Then, the embedment determination unit 1402 calculates an information volume B that the input image data can include therein from the blank area of the input image (step S1602).

An information embedment method can be determined appropriately in the above-described processing according to the first, second, third, fourth, or fifth embodiment.

When error-correcting coding processing is applied to the acquired embedment information, the embedment determination unit 1402 calculates the information volume A from an information volume of the acquired embedment information subjected to the error-correcting coding processing and the information embedment method.

The embedment determination unit 1402 compares the information volume B with the information volume A and determines whether or not the information volume B is equal to or larger than the information volume A (step S1603).

When the embedment determination unit 1402 determines that the information volume B is larger than the information volume A (step S1603: Yes), that is, when the entire embedment information to be embedded in the input image data can be embedded in the input image data, the processing proceeds to step S1505 of the flow chart shown in FIG. 15. When the embedment determination unit 1402 determines that the information volume B is not larger than the information volume A (step S1603: No), that is, when the information embedment area of the input image data is not enough to embed the entire embedment information, the processing proceeds to step S1504 of the flow chart shown in FIG. 15.

In the embedment determination processing explained in the flow chart shown in FIG. 16, the information volume B is calculated from the blank area of the input image data. Alternatively, the embedment determination processing can be performed depending on whether or not the information embedment unit 1406 can embed the acquired embedment information in the input image data after attempting to embed the acquired embedment information in the input image data.

In the sixth embodiment described above, when the embedment determination unit 1402 determines that the acquired embedment information cannot be embedded in the input image data in step S1503 of the flow chart shown in FIG. 15, the image editor 1404 edits the input image data by forcibly applying image processing such as background removal to the input image data. When an information embedment area of edited image data in which embedment information can be embedded is still insufficient after the image processing of the background removal, the acquired embedment information can be embedded in image data by using an image processing method according to a second embodiment described below.

In the sixth embodiment described above, the present invention is applied to a facsimile, and embedment information is embedded in image data as a digital watermark. The present invention can be applied to an information processing apparatus such as a personal computer. When information is embedded in a PPT (PowerPoint) file or the like, an information embedment area of the PPT file can be enlarged by removing a background image or a pattern of the PPT file using a pattern matching method.

Figure 17:
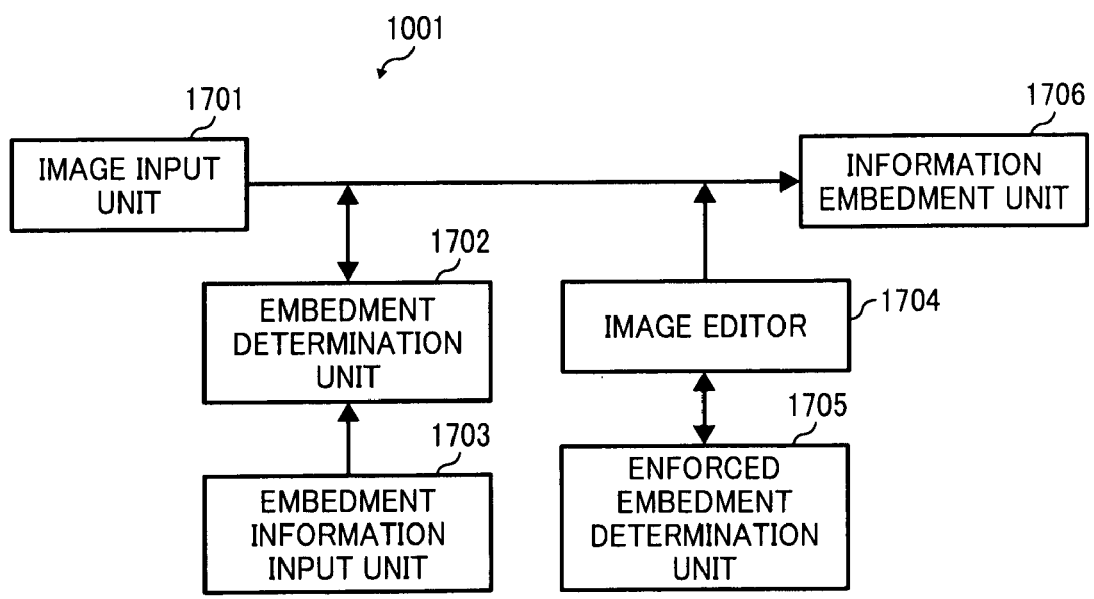
FIG. 17 is a block diagram showing configuration of an information embedment device of a seventh embodiment according to the present invention.
Figure 18:
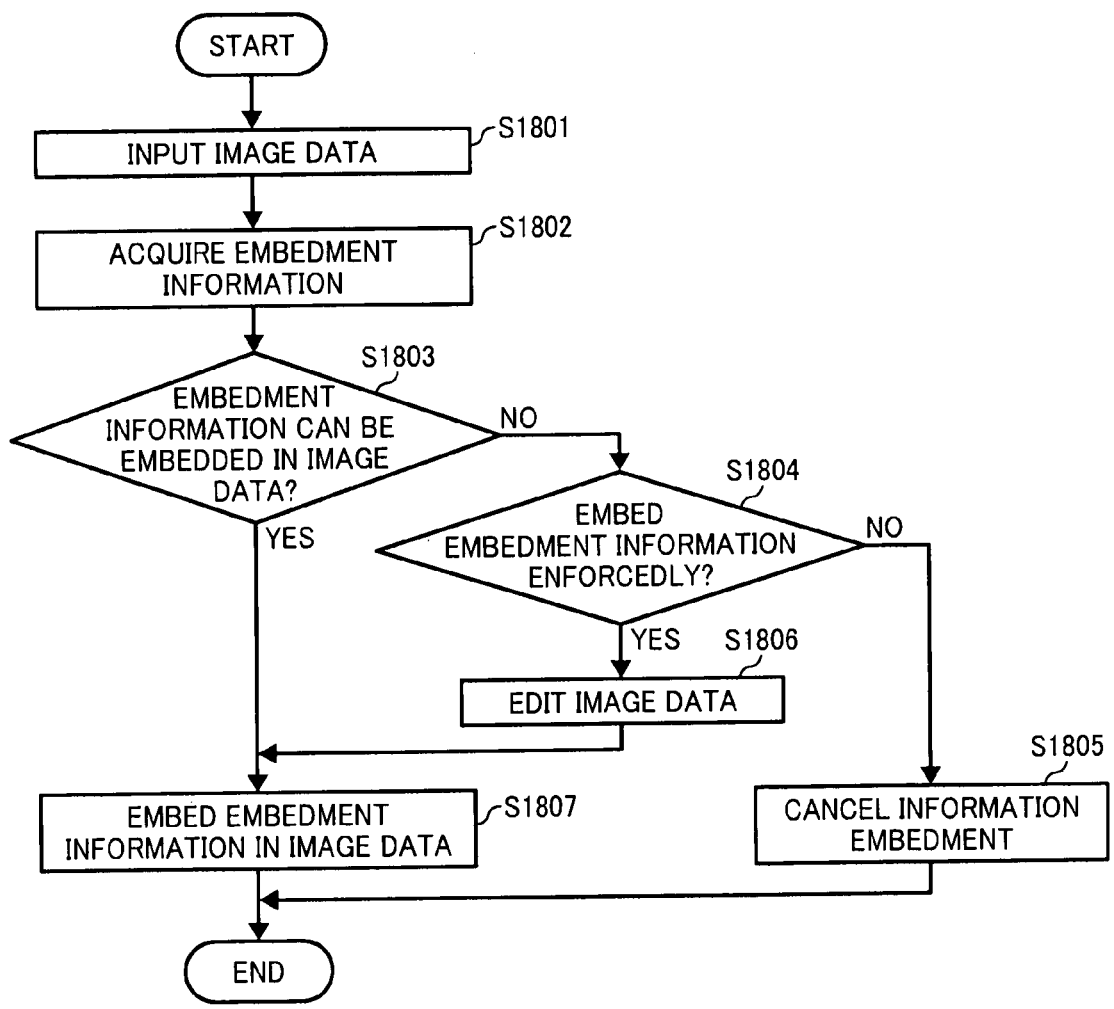
FIG. 18 is a flow chart describing entire processing by the information embedment device according to the seventh embodiment.
Figure 19:
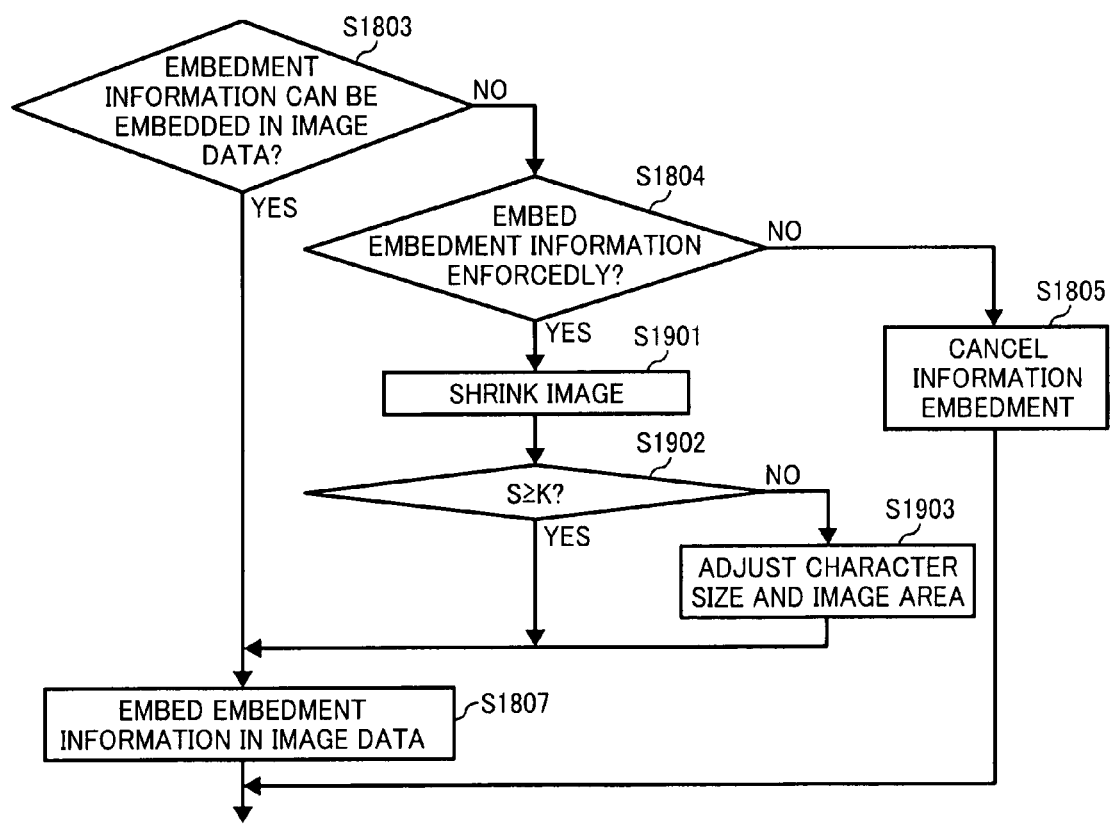
FIG. 19 is a flow chart describing image processing in step S1806 in the flow chart shown in FIG. 18.

FIG. 17 is a block diagram showing configuration of an information embedment device 1001 of a seventh embodiment according to the present invention. FIG. 18 is a flow chart describing entire processing by the information embedment device 1001 of the seventh embodiment according to the present invention. FIG. 19 is a flow chart describing image processing in step S1806 in the flow chart shown in FIG. 18. The seventh embodiment according to the present invention is applied to an information processing apparatus such a personal computer or the like and embeds embedment information in image data such as an ordinary document including a text area, a figure area, a table area, and so forth.

The configuration of the information embedment device 1001 according to the seventh embodiment is explained with reference to FIG. 17. As shown in FIG. 17, the configuration of the information embedment device 1001 according to the seventh embodiment includes an image input unit 1701 such as a scanner or the like, an embedment determination unit 1702, an embedment information input unit 1703, an image editor 1704, an enforced embedment determination unit 1705, and an information embedment unit 1706. The information embedment device 1001 according to the seventh embodiment can be included in or equivalent to the information embedment processor 116 of the image processing apparatus 1 according to the first, second, third, fourth, or fifth embodiment described above. A hardware configuration of the information processing apparatus in which the information embedment device 1001 according to the seventh embodiment is employed, which is not shown, includes a memory, a CPU, and so forth. The CPU executes the embedment determination unit 1702, the embedment information input unit 1703, the image editor 1704, the enforced embedment determination unit 1705, and the information embedment unit 1706 that are configured by software and stored in the memory to employ functions thereof.

The entire processing of the information embedment device 1001 according to the seventh embodiment is explained with reference to the flow chart shown in FIG. 18.

First, image data as a document image is input from the image input unit 1701 such as a scanner, a network, or the like (step S1801). Then, embedment information is acquired from the embedment information input unit 1703 (step S1802). When the image data and the embedment information are input, the embedment determination unit 1702 determines whether or not the input embedment information can be embedded in the input image data (step S1803). The embedment determination processing in step S1803 can be the same as the embedment determination processing according to the sixth embodiment shown in FIG. 16.

When the embedment determination unit 1702 determines that the input embedment information can be embedded in the input image data (step S1803: YES), the information embedment unit 1706 embeds the acquired embedment information in the input image data as is (step S1807), and the processing terminates.

When the embedment determination unit 1702 determines that the acquired embedment information cannot be embedded in the input image data (step S1803: NO), the enforced embedment determination unit 1705 allows a user to select whether the acquired embedment information is embedded in the input image data by editing thereof or is cancelled to be embedded (step S1804). Alternatively, from the beginning, enforced information embedment can be performed without allowing a user to select edit or cancel by setting a driver or the like.

When the user selects to cancel information embedment of the acquired embedment information in the input image data (step S1804: NO), the enforced embedment determination unit 1705 cancels the information embedment (step S1805), and the processing terminates.

When the user selects to embed the acquired embedment information in the input document image forcibly (step S1804:YES), the image editor 1704 edits the input image data and generates an area in which the acquired embedment information is embedded (step S1806). Then, the information embedment unit 1706 embeds the acquired embedment information in edited image data (step S1807), and the processing terminates.

Next, the image processing in step S1806 in the flow chart shown in FIG. 18 is described in detail with reference to the flow chart shown in FIG. 19. The image processing described below can be replaced with the image processing described in the sixth embodiment.

When the embedment determination unit 1702 determines that the acquired embedment information cannot be embedded in the input image data (step S1803: NO) and the user selects to embed the acquired embedment information in the input image data (step S1804: YES), in order to enlarge an area in which the acquired embedment information can be embedded by enlarging a margin, the image editor 1704 shrinks the document image in the input image data by comparing the information volume B that the input image data can include therein with the information volume A of the acquired embedment information to be embedded in image data calculated by embedment determination unit 1702 in the processing described in FIG. 16. The image editor 1704 shrinks the document image until the information volume B becomes the same as the information volume A (step S1901). That is, the image editor 1704 shrinks the document image until obtaining an information volume required to embed the acquired embedment information in image data input in step S1801.

After the shrinkage processing performed in step S1901, the acquired embedment information can be immediately embedded in image data subjected to the shrinkage processing. However, the image editor 1704 occasionally shrinks characters on the document image until the characters cannot be read, and such a problem is required to be avoided. The image editor 1704 calculates a character size S in a character area of a shrunk document image and compares the character size S with a predetermined size K (step S1902). When the character size S is larger than the predetermined size K (step S1902: YES), the image editor 1704 determines that characters on the document image are large enough to be read, and the processing proceeds to step S1807.

When the character size S is smaller than the predetermined size K, the image editor 1704 determines that the characters on the document image cannot be read. The image editor 1704 stops shrinking the character area so that the character size S becomes the same as the predetermined size K and shrinks areas other than the character area further by shifting the other areas to minimize spaces between each of the other areas (step S1903). Thereby, the information volume required to embed the acquired embedment information in edited image data can be obtained, and the processing proceeds to step S1807.

As for image processing to increase a blank area of the input image data by the image editor 1704, other image processing such as removing spaces between lines of the input image data, shrinking a character font size of the input image data, or the like, can be used instead of shrinking the entire document image. When an information embedment area of the input image data is still insufficient after the other image processing, processing similar to the processing in step S1903 can be performed on the input image data.

Each processing in each of the sixth and seventh embodiments according to the present invention is written as a program, and a CPU included in each apparatus to which the present invention is applied can execute the program. The program can be distributed by storing the program on a recording medium such as an FD (floppy disk), a CDROM (compact disk read only memory), a DVD (digital versatile disk), or the like, or as digital information through a network.

As described above, in the sixth and seventh embodiments according to the present invention, embedment information is embedded in a blank area of input image data. A relation between an information volume that input image data can include therein and a blank area of the input image data is explained next. Normally, when information is forcibly embedded in a background including contents of image data instead of a blank area, an embedment pattern embedded therein is deformed and cannot be extracted therefrom. An area of image data in which information can be embedded is limited to a blank area of the image data, and an embedment pattern embedded in a blank area can be extracted. Thus, as a blank area of the image data increases, an information volume that input image data can include therein also increases.

FIG. 20 is an illustration schematically showing a method to calculate an information volume that input image data can include therein from a blank area of the input image data. A technique known as a segmentation method can be employed to calculate a blank area of image data. Thus, the description about the technique is omitted herein.

A method to calculate the information volume A of embedment information to be embedded in image data is explained first. The method to calculate the information volume A depends on information embedment methods to embed the embedment information. For example, an information embedment method can be specified with a table in which information embedment methods are related to respective information volumes that can be embedded in input image data by using respective information embedment methods. Alternatively, when embedment information of text data such as a user name, a date, or the like, is specified, the information volume A can be calculated by converting the embedment information into a bit array.

Next, a method to calculate the information volume B that input image data can include therein is explained. When the information volume B depends only on areas, a table in which an information volume I that a unit area can embed embedment information therein is related to an area S required to embed the information volume I of embedment information is used. The information volume B can be calculated by using the following equation:

Information volume $B=(\text{Blank area}/\text{Area } S) \times \text{Volume } I$ When the information volume B depends on the number of embedment rectangles R, a table in which the information volume I that the embedment rectangle R can embed embedment information therein is related to the number of the embedment rectangles R is used, and a number K of the embedment rectangles R that are included in a blank area is calculated. When identical information is embedded in image data, the information volume B is identical to the information volume I. When different information is embedded in respective embedment rectangles R, the information volume B is calculated as (the number K)×(the information volume I). When the embedment rectangle R cannot be obtained in the blank area, the information volume B becomes zero.

When embedment information is a bar code and a part of the bar code is cut away, the embedment information becomes invalid. Thus, when the bar code is not included in a blank area, the information volume B becomes zero. When the bar code is included in a blank area, the information volume B is identical to an information volume of the bar code.

Figure 20A:
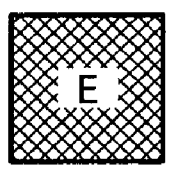
FIG. 20 is an illustration schematically showing a method to calculate an information volume.
Figure 20B:
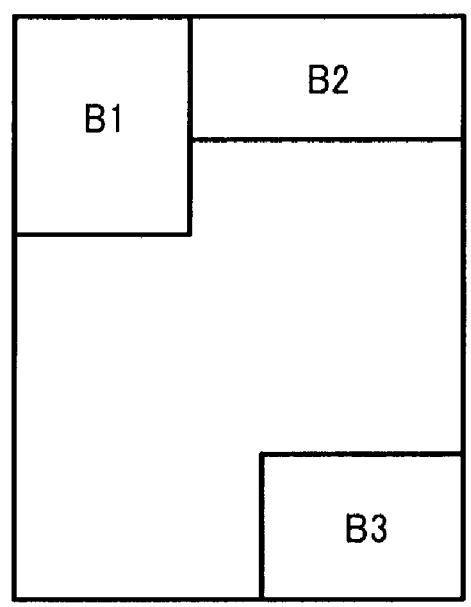
Figure 20C:
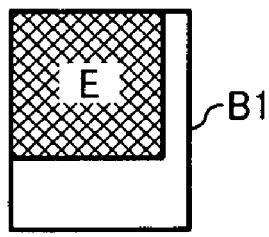
Figure 20D:
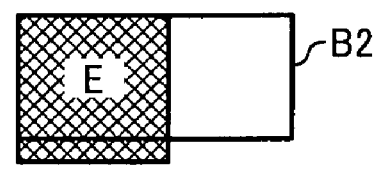

An example to embed embedment information in image data is explained with reference to FIG. 20. As shown in FIG. 20A, an embedment pattern E of which information volume is the information volume A is input as embedment information. Input image data includes blank areas B1, B2, and B3 as shown in FIG. 20B. A blank area having the largest area among the blank areas B1, B2, and B3 is referred to as a blank area Bmax. As shown in FIG. 20C, when the embedment pattern E is included in the blank area Bmax, the information volume B of the blank area Bmax is identical to the information volume A of the embedment pattern E. When the embedment pattern E is embedded repeatedly, the information volume B of the blank area Bmax is also identical to the information volume A of the embedment pattern E. On the other hand, when the embedment pattern E is not included in the blank area B2, the information volume B of the blank area B2 is zero.

When the embedment pattern E is embedded with different patterns repeatedly, the information volume A increases. When the input image data includes blank areas B1 through Bn, the blank area Bn is specified with respect to each different pattern. A number C of the blank areas included in the input image data is counted, and a total information volume required to embed all the different patterns of the embedment pattern E is represented as (the information volume A of the embedment pattern E)×C.

When error-correcting coding processing is applied to embedment information, the information volume A of the embedment information cannot be calculated with the above-described method using an area. When embedment information subjected to error-correcting coding processing, another method can be employed. For example, in the method, after the embedment information is embedded in image data, the embedment information is searched. Then, whether or not the image data includes an enough area of the information volume B is determined whether or not the embedment information is detected.

The information embedment device of the sixth or seventh embodiment according to the present invention can be configured in an image forming apparatus such as a facsimile, a copier, a printer, an MFP (multifunction peripheral), or the like. The information embedment device of the sixth or seventh embodiment according to the present invention can also be configured in an information processing apparatus such as a personal computer or the like. Embedment information can be prepared by an image forming apparatus such as a facsimile, a copier, a printer, an MFP, or the like, or an information processing apparatus such as a personal computer or the like.

It should be noted that the above-described embodiments are merely illustrative, and numerous additional modifications and variations are possible in light of the above teachings. For example, elements and/or features of different illustrative and preferred embodiments herein may be combined with each other and/or substituted for each other within the scope of this disclosure. It is therefore to be understood that the disclosure of this patent specification may be practiced otherwise than as specifically described herein.

What is claimed is:

1. An image processing apparatus configured to embed embedment information in image data to generate embedded image data, the apparatus comprising:
   an embedment information acquisition unit configured to acquire embedment information to be embedded in the image data;
   a usage property information acquisition unit to acquire usage property information indicating a usage property of the embedded image data to be generated from a user, the usage property information including a request of the user for the embedded image data and a usage purpose of the embedded image data;
   an information embedment manner determination unit configured to determine an information embedment manner to embed the embedment information to the image data according to the usage property information of the embedded image data; and an information embedment unit configured to embed the acquired embedment information in the image data based on the information embedment manner determined by the information embedment manner determination unit, wherein the information embedment manner determination unit is further configured to:

define a plurality of functions that are required to be added to the image data so as to generate the embedded image data having the usage property specified by the usage property information acquired from the user;

select, from a plurality of information embedment manners, an information embedment manner based on the defined plurality of functions as the information embedment manner to be used for embedding the embedment information to the image data;

calculate, for each one of the plurality of information embedment manners, similarity between the defined plurality of functions and a plurality of available functions that can be provided by each of the plurality of information embedment manners; and select the information embedment manner based on the calculated similarity.

2. The image processing apparatus according to claim 1, wherein the usage property information acquisition unit comprises:

an inquiry display unit configured to visually display an inquiry relating to the usage property of the embedded image data to be generated by embedding the acquired embedment information in the image data; and an answer input unit configured to input an answer to the inquiry, wherein the usage property information acquisition unit generates the usage property information based on the input answer.

3. The image processing apparatus according to claim 1, wherein the usage property information acquisition unit acquires the usage property information further from information included in the image data.

4. The image processing apparatus according to claim 1, wherein the information embedment unit comprises:

an embedment determination unit configured to determine whether or not the acquired embedment information can be embedded in the image data;

an image edit unit configured to perform predetermined image processing on the image data such that the acquired embedment information can be embedded in the image data when the embedment determination unit determines that the acquired embedment information cannot be embedded in the image data; and an interactive determination unit configured to allow the user to determine whether or not to embed the acquired embedment information in the image data after applying the predetermined image processing.

5. The image processing apparatus according to claim 4, wherein the embedment determination unit determines whether or not the acquired embedment information can be embedded in the image data based on a volume of the acquired embedment information and a volume of information that the image data can include therein, the volume of information that the image data can include therein being determined by a size of a blank area included in the image data.

6. The image processing apparatus according to claim 4, wherein the predetermined image processing performed by the image edit unit on the image data includes at least one of image processing of size modification of an object included in the image data, shifting the object so as to increase a blank area size of the image data, and removal of a background or a background image of the image data.

7. An image processing method to embed embedment information in image data to generate embedded image data, the method comprising the steps of:

acquiring the image data, and the embedment information to be embedded in the image data;

acquiring usage property information indicating a usage property of the embedded image data to be generated from a user, the usage property information including a request of the user for the embedded image data and a usage purpose of the embedded image data;

determining an information embedment manner to embed the embedment information to the image data according to the usage property information of the embedded image data;

embedding the acquired embedment information in the image data according to the determined information embedment manner;

defining a plurality of functions that are required to be added to the image data so as to generate the embedded image data having the usage property specified by the usage property information acquired from the user;

selecting, from a plurality of information embedment manners, an information embedment manner based on the defined plurality of functions as the information embedment manner to be used for embedding the embedment information to the image data;

calculating, for each one of the plurality of information embedment manners, similarity between the defined plurality of functions and a plurality of available functions that can be provided by each of the plurality of information embedment manners; and selecting the information embedment manner based on the calculated similarity.

8. The image processing method according to claim 7, further comprising the steps of:

visually displaying an inquiry relating to the usage property of the embedded image data to be generated by embedding the acquired embedment information in the image data;

inputting an answer to the inquiry; and generating the usage property information based on the input answer.

9. The image processing method according to claim 7, further comprising the step of acquiring the usage property information further from information included in the image data.

10. The image processing method according to claim 7, further comprising the steps of:

determining whether or not the acquired embedment information can be embedded in the image data;

performing predetermined image processing on the image data such that the acquired embedment information can be embedded in the image data when the step of determining determines that the acquired embedment information cannot be embedded in the image data; and confirming whether or not the acquired embedment information is embedded in the image data after applying the predetermined image processing.

11. The image processing method according to claim 10, wherein the performing predetermined image processing on the image data includes determining whether or not the acquired embedment information can be embedded in the image data based on a volume of the acquired embedment information and a volume of information that the image data can include therein, the volume of information that the image data can include therein being determined by a size of a blank area included in the image data.

12. The image processing method according to claim 10, wherein the performing the predetermined image processing on the image data includes at least one of image processing of size modification of an object included in the image data, shifting of the object so as to increase a blank area size of the image data, and removal of a background or a background image of the image data.

13. A non-transitory computer readable medium with a program stored thereon, when run on an image processing apparatus, to cause the image processing apparatus to perform the steps of:

acquiring image data, and embedment information to be embedded in the image data;

acquiring from a user usage property information indicating a usage property of embedded image data to be generated by embedding the acquired embedment information in the image data, the usage property information including a request of the user for the embedded image data and a usage purpose of the embedded image data;

determining an information embedment manner to embed the embedment information to the image data according to the usage property information of the embedded image data;

embedding the acquired embedment information in the image data according to the determined information embedment manner;

defining a plurality of functions that are required to be added to the image data so as to generate the embedded image data having the usage property specified by the usage property information acquired from the user;

selecting, from a plurality of information embedment manners, an information embedment manner based on the defined plurality of functions as the information embedment manner to be used for embedding the embedment information to the image data;

calculating, for each one of the plurality of information embedment manners, similarity between the defined plurality of functions and a plurality of available functions that can be provided by each of the plurality of information embedment manners; and selecting the information embedment manner based on the calculated similarity.

14. The non-transitory computer readable medium according to claim 13, configured to cause the image processing apparatus to perform the steps of:

visually displaying an inquiry relating to the usage property of the embedded image data to be generated by embedding the acquired embedment information in the image data;

inputting an answer to the inquiry; and generating the usage property information based on the input answer.

15. The non-transitory computer readable medium according to claim 13, configured to cause the image processing apparatus to perform the step of acquiring the usage property information further from information included in the image data.

16. The non-transitory computer readable medium according to claim 13, configured to cause the image processing apparatus to perform the steps of:

calculating a volume of the acquired embedment information;

calculating a volume of information that the image data can include therein, which is determined by a size of a blank area included in the image data;

determining whether or not the acquired embedment information can be embedded in the image data by comparing the volume of the acquired embedment information and the volume of information that the image data can include therein;

performing predetermined image processing on the image data such that the acquired embedment information can be embedded in the image data when it is determined that the acquired embedment information cannot be embedded in the image data; and confirming whether or not the acquired embedment information is embedded in the image data after applying the predetermined image processing.

* * * * *